US009036545B2

(12) United States Patent
Lindner et al.

(10) Patent No.: US 9,036,545 B2
(45) Date of Patent: May 19, 2015

(54) EXCHANGING PRESENCE INFORMATION IN A COMMUNICATIONS NETWORK

(75) Inventors: Mark Lindner, Superior, CO (US); Xiaona An, Portland, OR (US); Shane Dewing, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 111 days.

(21) Appl. No.: 13/303,751

(22) Filed: Nov. 23, 2011

(65) Prior Publication Data
US 2012/0300698 A1    Nov. 29, 2012

Related U.S. Application Data

(60) Provisional application No. 61/421,032, filed on Dec. 8, 2010.

(51) Int. Cl.
*H04L 29/08* (2006.01)
*H04W 4/08* (2009.01)
*H04L 29/06* (2006.01)

(52) U.S. Cl.
CPC .............. *H04L 67/24* (2013.01); *H04W 4/08* (2013.01); *H04L 65/403* (2013.01); *H04L 67/104* (2013.01); *H04L 67/1044* (2013.01)

(58) Field of Classification Search
CPC ........................................................ H04L 67/24
USPC ............................................................ 370/328
See application file for complete search history.

(56) References Cited

U.S. PATENT DOCUMENTS 7,746,226 B2    6/2010    Cohen et al.
7,911,987 B2    3/2011    Lazaridis et al.
(Continued)

FOREIGN PATENT DOCUMENTS

EP    2239921 A1    10/2010
JP    2003296259 A    10/2003
(Continued)

OTHER PUBLICATIONS

Florian Wegscheider, Minimizing unnecessary notification Traffic in the IMS presence System, Jan. 16-18, 2006, IEEE, entire document.*
(Continued)

*Primary Examiner* — Mark Rinehart
*Assistant Examiner* — Maharishi Khirodhar
(74) *Attorney, Agent, or Firm* — Raphael Freiwirth

(57) ABSTRACT

The disclosure relates to decentralized presence management within a communications system performed at a user device. An embodiment of the disclosure comprises selectively updating at least one frequency at which the user device transmits presence update messages to one or more other user devices that belong to a contact group associated with the user device. The embodiment further comprises transmitting one or more presence update messages in accordance with the selectively updated frequency. Another embodiment of the disclosure comprises obtaining a subset of contacts of a subscriber operating the user device that form a presence update group. The embodiment further comprises identifying a plurality of sub-groups within the presence update group based on priorities of the subset of contacts. The embodiment further comprises transmitting one or more presence update messages to less than all of the identified plurality of sub-groups.

47 Claims, 12 Drawing Sheets

(56) References Cited

U.S. PATENT DOCUMENTS

| | | | |
|---|---|---|---|
| 8,136,125 B2* | 3/2012 | Beadle et al. | 719/318 |
| 8,180,407 B1* | 5/2012 | Kindred et al. | 455/574 |
| 2006/0055537 A1* | 3/2006 | Jackson | 340/572.1 |
| 2006/0114882 A1 | 6/2006 | Mills | |
| 2006/0117050 A1* | 6/2006 | John et al. | 707/101 |
| 2006/0194596 A1 | 8/2006 | Deng | |
| 2006/0242235 A1 | 10/2006 | Classen et al. | |
| 2006/0276214 A1* | 12/2006 | Harris et al. | 455/519 |
| 2007/0192735 A1* | 8/2007 | Lehto et al. | 715/810 |
| 2008/0084977 A1* | 4/2008 | Nayak et al. | 379/130 |
| 2008/0183866 A1 | 7/2008 | Maeda et al. | |
| 2008/0184170 A1* | 7/2008 | Periyalwar | 715/841 |
| 2008/0256107 A1* | 10/2008 | Banga et al. | 707/102 |
| 2008/0315990 A1 | 12/2008 | Komatsu | |
| 2009/0089804 A1 | 4/2009 | Beadle et al. | |
| 2009/0296930 A1* | 12/2009 | Krantz et al. | 380/247 |
| 2010/0262660 A1* | 10/2010 | Little et al. | 709/206 |
| 2010/0332597 A1* | 12/2010 | Varney | 709/204 |
| 2011/0064074 A1* | 3/2011 | Kreitzberg et al. | 370/352 |
| 2011/0066688 A1* | 3/2011 | Pinding | 709/206 |
| 2011/0145384 A1* | 6/2011 | Olrog | 709/223 |

FOREIGN PATENT DOCUMENTS

| | | |
|---|---|---|
| JP | 2010081019 A | 4/2010 |
| WO | 2007037018 A1 | 4/2007 |

OTHER PUBLICATIONS

International Search Report and Written Opinion—PCT/US2011/063994—ISA/EPO—May 23, 2012.

* cited by examiner

EXCHANGING PRESENCE INFORMATION IN A COMMUNICATIONS NETWORK

CLAIM OF PRIORITY UNDER 35 U.S.C. §119(e)

This application claims priority under 35 U.S.C. §119(e) to U.S. Provisional Application No. 61/421,032, entitled "METHOD AND APPARATUS FOR CLIENT-SIDE DISTRIBUTED AND DYNAMICALLY UPDATED NETWORK PRESENCE," filed Dec. 8, 2010, the entirety of which is incorporated by reference herein.

FIELD OF THE INVENTION

The disclosed embodiments pertain to networking and, in particular, to management of presence in relation to a network.

BACKGROUND

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal FDMA (OFDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

In conventional wireless communication systems, the user devices may store address books that list particular persons and businesses, and their respective telephone numbers and e-mail addresses. A user may initiate a communication with a party listed in the address book by entering appropriate commands, for example through the device's user interface. Only if the called party answers the call does the device user know that the calling party is available and willing to partake in a discussion. If the called party does not answer the call, the user of the device may have wasted time initiating the call. This process repeats if the user of the device wishes to make a second attempt, this time using alternate means, for example sending a text message to the same telephone number, or using another telephone number from the address book, or sending an e-mail message.

The above examples are for initiating communication with one called party. Additional activities are required for initiating a group communication through the user device connected to a wireless system. For example, a user may first provide a conference call vendor service with a list of invitees, and the vendor service may then send an e-mail invitation to each. Even if the user requests acceptance prior to a deadline earlier than the scheduled time of the conference call, the user will not know for certain who will in fact attend until the conference call begins. In addition, if the user determines from the acceptance count that the number of attendees will be too small, or that certain key persons will not attend, then the user must reschedule, and have another set of invitations sent.

SUMMARY

The disclosure relates to decentralized presence management within a communications system performed at a user device. An embodiment of the disclosure comprises selectively updating at least one frequency at which the user device transmits presence update messages to one or more other user devices that belong to a contact group associated with the user device. The embodiment further comprises transmitting one or more presence update messages in accordance with the selectively updated frequency.

Another embodiment of the disclosure comprises obtaining a subset of contacts of a subscriber operating the user device that form a presence update group. The embodiment further comprises identifying a plurality of sub-groups within the presence update group based on priorities of the subset of contacts. The embodiment further comprises transmitting one or more presence update messages to less than all of the identified plurality of sub-groups.

BRIEF DESCRIPTION OF THE DRAWINGS

The accompanying drawings are presented to aid in the description of the embodiments and are provided solely for illustration of examples related to the embodiments and not any limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action (described in more detail below with respect to FIG. 10).

Figure 1:
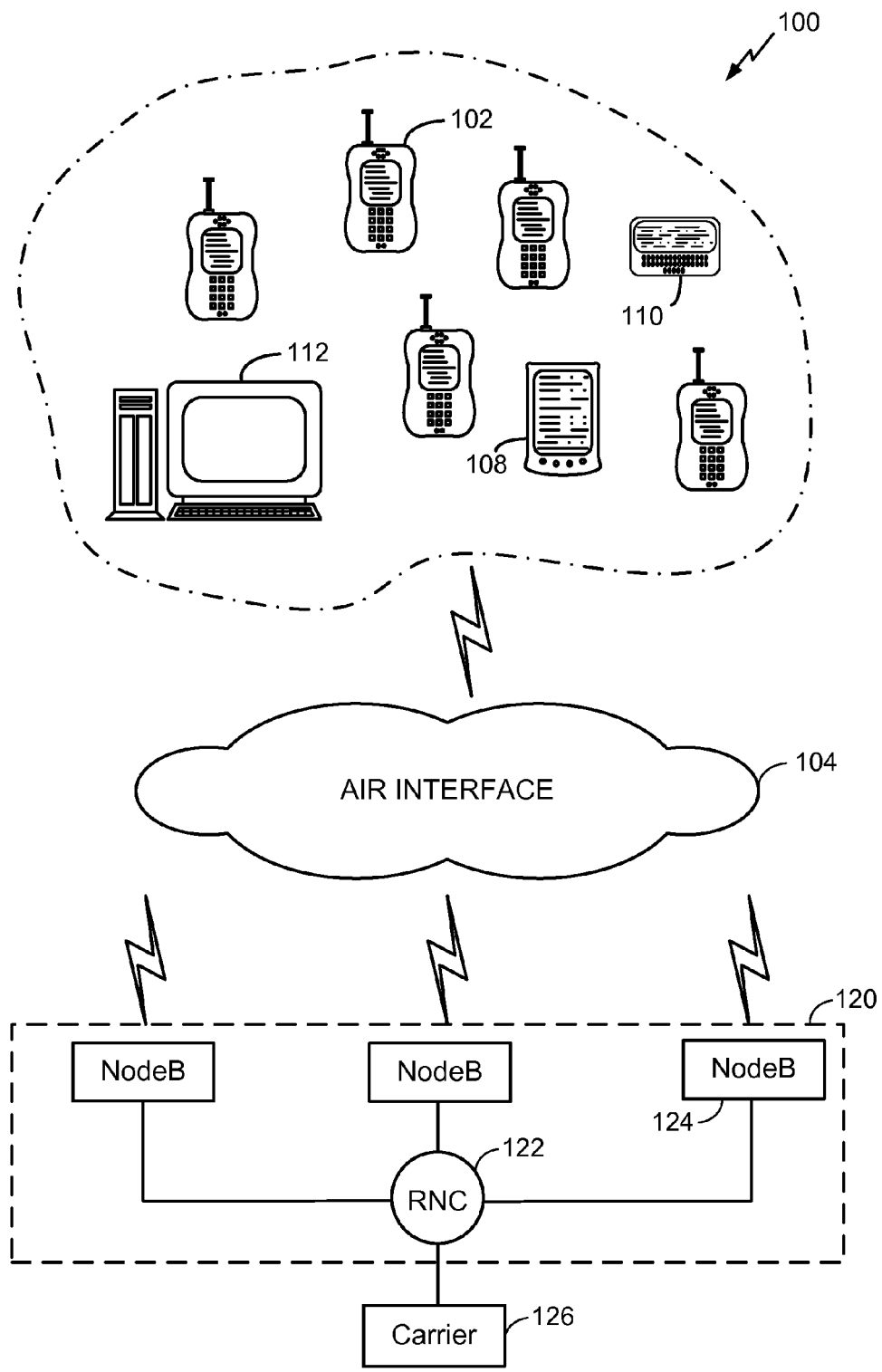
FIG. 1 is a diagram of a wireless network architecture that supports user equipment and networks in accordance with at least one embodiment.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple NodeBs 124. In a similar manner to the core network 126, the RNC 122 is typically connected to the NodeBs 124 by a network, the Internet and/or PSTN for data transfer and/or voice information. The NodeBs 124 can broadcast data messages wirelessly to the UEs, such as cellular telephone 102. The NodeBs 124, RNC 122 and other components may form the RAN 120, as is known in the art. However, alternate configurations may also be used and the invention is not limited to the configuration illustrated. For example, in another embodiment the functionality of the RNC 122 and one or more of the NodeBs 124 may be collapsed into a single "hybrid" module having the functionality of both the RNC 122 and the NodeB(s) 124.

Figure 2A:
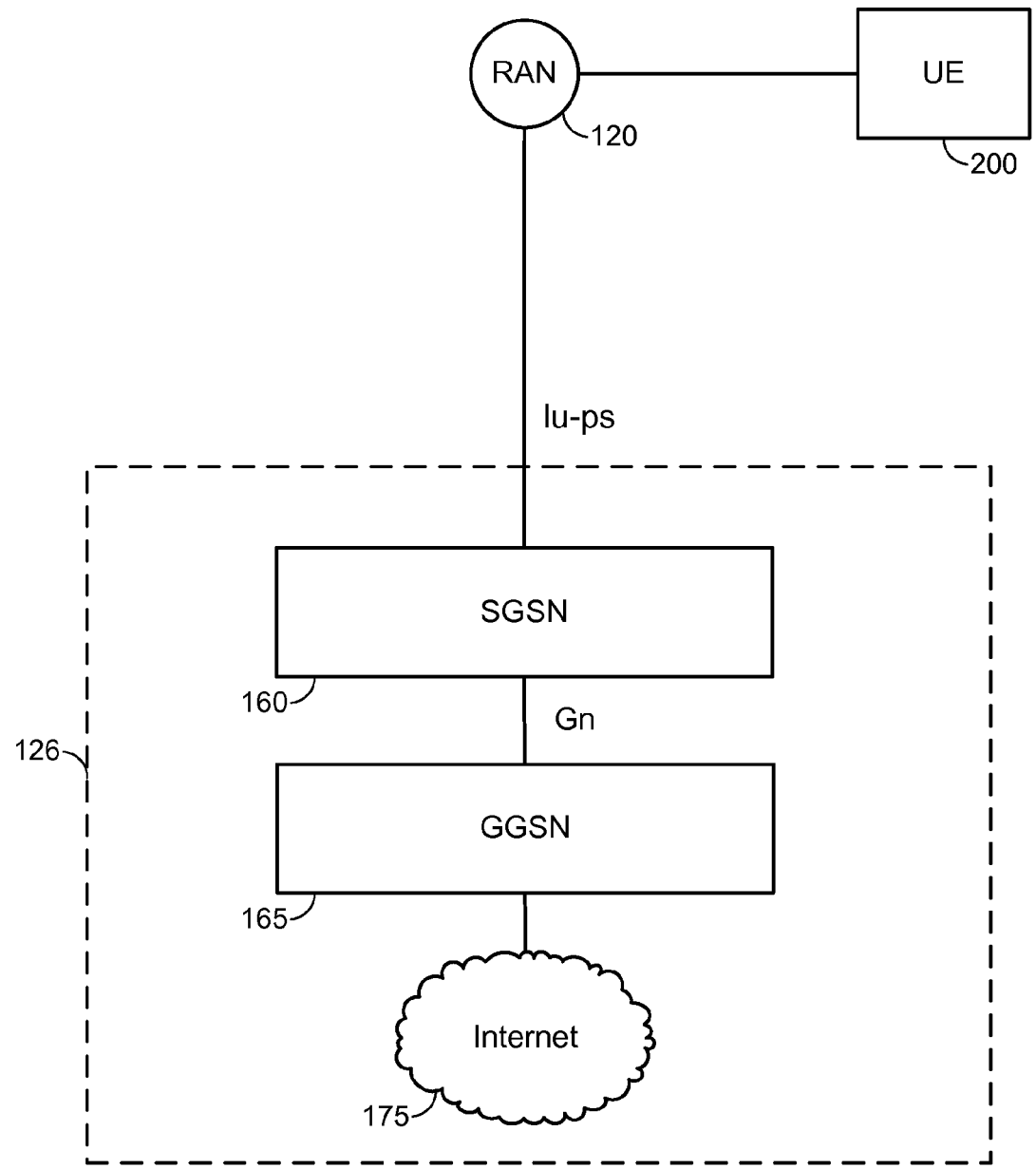
FIG. 2A illustrates the core network of FIG. 1 according to an example embodiment.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SSGN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via an Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
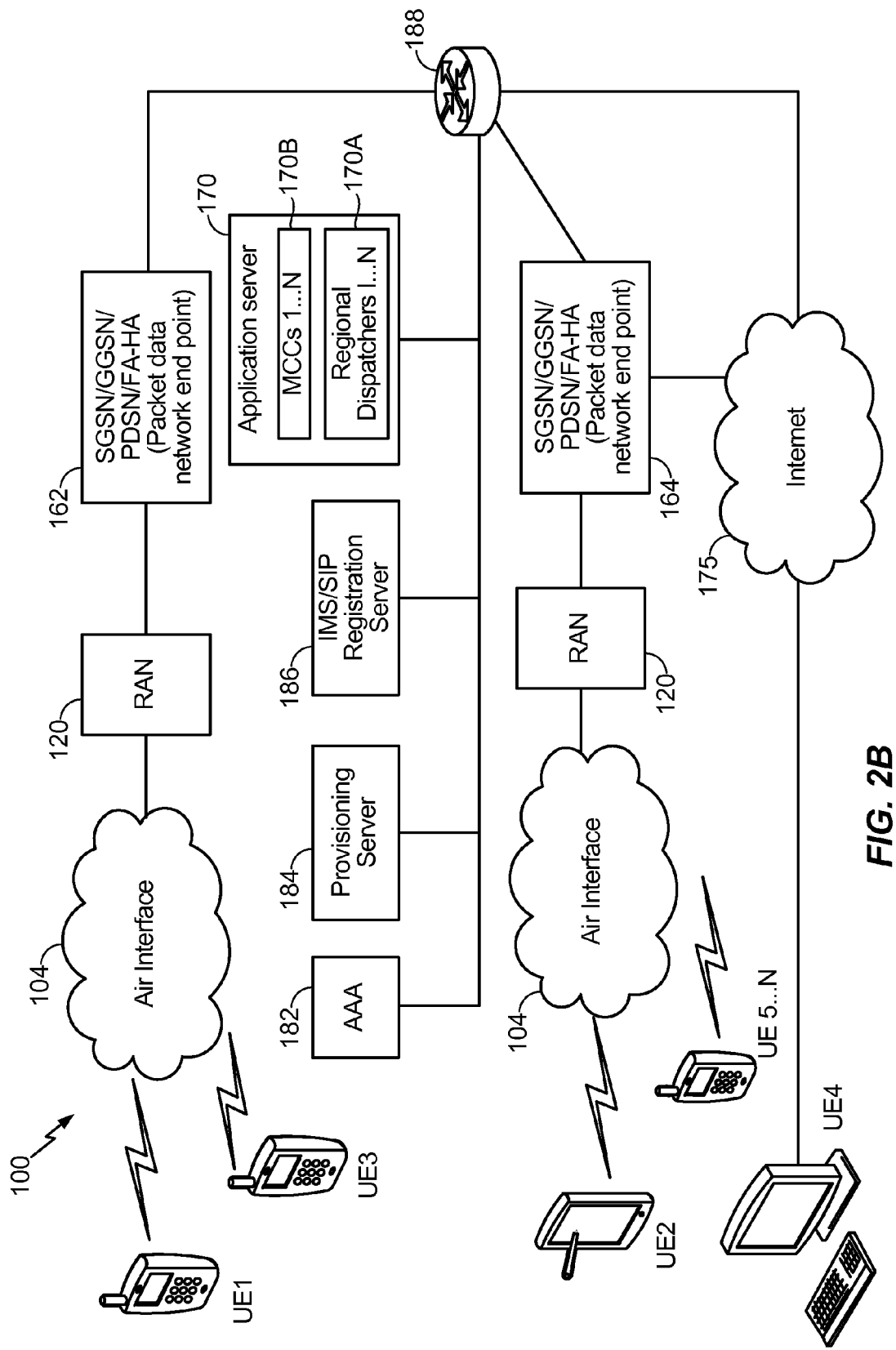
FIG. 2B illustrates an example of a wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China).

For reasons as described above, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
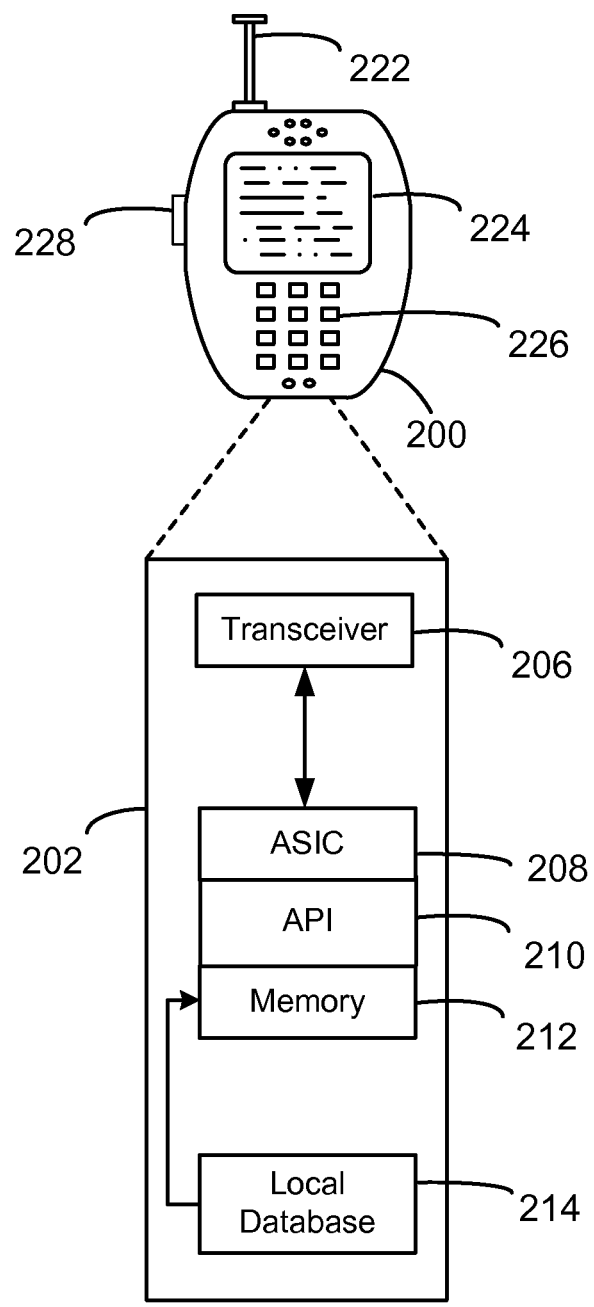
FIG. 3 is an illustration of user equipment in accordance with at least one embodiment.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In one example according to one embodiment, a subscriber social communication system may have a plurality of subscribers, and each subscriber may have a definable set of privileges to access, participate in and conduct various kinds of communications within the subscriber system. Subscriber user devices may be any of the previously described types and kinds of the user devices, e.g., cellular telephones, PDAs, and net books.

It will be understood that a "user device" may not necessarily be a hardware unit that is unique to a particular subscriber. As one illustration, it is contemplated that a subscriber may be provided with a portable authorization/verification mechanism permitting the subscriber to temporarily configure a user-accessible device to have that subscriber's usual social network configurations and settings, including public profile (with respect to the social network) authorizations, internal priority settings, privacy settings, and other interface with other subscribers, each of which will be described in greater detail at later sections.

According to one or more embodiments, a subscriber's user device establishes and dynamically updates a list or other local database indicating other subscribers with which that subscriber is communicating, or has communicated, and indicating the current status of each in relation to the network. Criteria and rules for sorting the list, adding, maintaining and removing other subscribers from the list, include the user device's currently stored characterization of other subscribers' presence, recency of communication with such other subscribers, alphabetical order as well as other criteria and rules that will be described in greater detail later.

For brevity, this list or database of subscribers meeting these criteria, which may be maintained locally by each subscriber's user device(s), will be termed a "Presence Update Group." It will be understood that the phrase "Presence Update Group" is an arbitrary name used for purposes of reference within this disclosure, and that the phrase is not intended to have, or convey any meaning as to any particular method, act, graphical form, arrangement, order of carrying out acts, or structure(s). Accordingly, as used herein, the Presence Update Group includes a set of contacts for a particular subscriber to which that subscriber directs presence status updates (e.g., notifying the Presence Update Group when the subscriber is busy, available, etc.) and also for which the subscriber receives presence status updates (e.g., indicating whether the contact(s) are busy, available, etc.). It will be appreciated that the subscriber can include one or more additional contacts that are not part of the Presence Update Group, such that the Presence Update Group can correspond to a subset of the subscriber's contacts in certain implementations.

In one aspect, entries or records in the Presence Update Group identifying another subscriber's user device characterize that subscriber's participation and availability, or presence, with respect to a network that may be shared, in whole or in part, among such subscribers. The state of the presence is defined by various parameters that, collectively, may be represented by a "presence value" or "PV."

According to one embodiment, a given subscriber's user device may be configured to update its Presence Update Group to maintain in its Presence Update Group only such other subscribers that the instant subscriber's user device is likely, in a near term, to have communication. Among other benefits, this feature provides a reduction in unnecessary processing and storage in the user devices, and further provides for reduction in unnecessary messaging overhead due to the user devices updating their Presence Update Group to reflect status changes of irrelevant user devices. In this manner, the Presence Update Group may correspond to a reduced list or subset of contacts from the given subscriber's contact book.

In one aspect, a given subscriber's user device may estimate a likelihood of future communication with a contact based on current participation in a communication between the given subscriber's user device and the contact and, to a lesser extent, recent participation in a communication between the given subscriber's user device and the contact. In a further aspect, the user device may maintain a PV for subscriber groups with which the subscriber is in current communication, or groups with which the subscriber has recently participated—with "groups" being described in greater detail at later sections. In an example, each subscriber group may correspond to a sub-group of the Presence Update Group.

According to one embodiment, a given subscriber's user device, in maintaining its own Presence Update Group, can interact with other user devices in a manner further providing a distributed, dynamic updating of the local Presence Update Group. In one aspect, the given subscriber's user device may be configured to dictate when to transmit, to other subscribers' user devices, requests for updated information characterizing the other user devices' presence in the network. For brevity, these requests will be referred to hereinafter as "PV update requests." The sending user device uses the responses in updating (including removing) entries from its Presence Update Group. As will be described in greater detail, in one aspect the user devices may be configured to dictate the timing of sending the PV update requests in a manner to meet efficiency objectives regarding messaging overhead and frequency of updating the Presence Update Group.

In a further aspect, the given subscriber's user devices may send PV update requests for entries in their Presence Update Group based on the length of time since the user device last received a PV update from that particular other subscriber. Further to this aspect, the given subscriber's user device may be configured to establish and maintain a timeout counter for each of the subscribers in its Presence Update Group. Another example criteria may be user-selectable priorities, or application-specific priorities, e.g., whether or not the communications with the other subscriber in the Presence Update Group are pursuant to interactive real-time activities.

In one aspect of a dynamic updating by the given subscriber's user device of its local Presence Update Group, the given subscriber's user device may be configured to detect and utilize one or more triggering events in determining when to send PV update requests. As one illustration, a triggering event may be an initial switch-on, or power-up of the given subscriber's user device, from a previous power-down state. Other triggering events may be the given subscriber unlocking his/her user device (e.g., entering an alphanumeric unlock code), or the given subscriber initiating, e.g., via a touch-screen icon on the user device, an application to perform social networking.

In one additional aspect, the given subscriber's user device may be configured to cease updating its Presence Update Group when that user device is locked, to conserve battery power and/or to reduce unnecessary message traffic on the network. This aspect may couple with the above-described example triggering event of sending a PV update request upon unlocking the user device. It will be understood that the given subscriber's user device according to this aspect may be configured to distinguish between different modes of user device lock in determining whether to cease updating the Presence Update Group. For example, a user device may have one lock mode for preventing unauthorized persons from using the device, and another lock mode for preventing inadvertent key pressing, e.g., as may occur when placed in a user's pocket. The latter lock mode may be called an "inadvertent key disabling lock mode." Further to this aspect, the subscriber may wish to maintain Presence Update Group updating while the user device is in the inadvertent key disabling lock mode.

Additionally, the given subscriber's user device may be configured to cease updating its Presence Update Group, the visual representation of its Presence Update Group, or both, when it is likely that the subscriber is not looking at the device's display, e.g. when the subscriber has put it down or is on a call and is holding it at his or her ear. The user device may cease updating its Presence Update Group as soon as it senses that it has been put down (e.g. has become motionless or any movement is less than a threshold) or that the subscriber is on a call, or after a threshold period of time has elapsed. The user device may also use other information in conjunction with sensing that it has been put down. For example, if it is late at night and the user device determines that it has been motionless for an hour, for example, the device may assume that the subscriber is sleeping and cease updating its Presence Update Group. The user device can sense that the subscriber has put it down by leveraging the user device's gyroscope and accelerometer, as would be readily understood by one of ordinary skill in the art.

In another aspect, similar in part to the above aspect, a user device may be configured to reduce its frequency of, or to cease sending PV update requests when the given subscriber's user device is executing an application that is likely to continue execution for an extended (e.g., a relatively long or non-transient period) duration, e.g., a media player or game.

In another aspect, the given subscriber's user device may include its own updated PV in one or more of its PV update requests issued to the Presence Update Group. For example, each time a target subscriber's user device receives a PV update request from a sending user device, the target user device is able to update its Presence Update Group to reflect the sending user device's updated PV. As will be appreciated, this feature may reduce the aggregate traffic resulting from the subscribers' respective user devices continuously updating their Presence Update Group.

As will be appreciated by persons of ordinary skill in the art upon reading this disclosure, the above-described and other features of the exemplary embodiments provide, among other benefits, a distributed monitoring that reduces the need for centralized server-based control and, further, provides a stable, self-adaptive social networking system that can handle increased, and varying subscriber loads, without server-related bottlenecks.

Figure 4A:
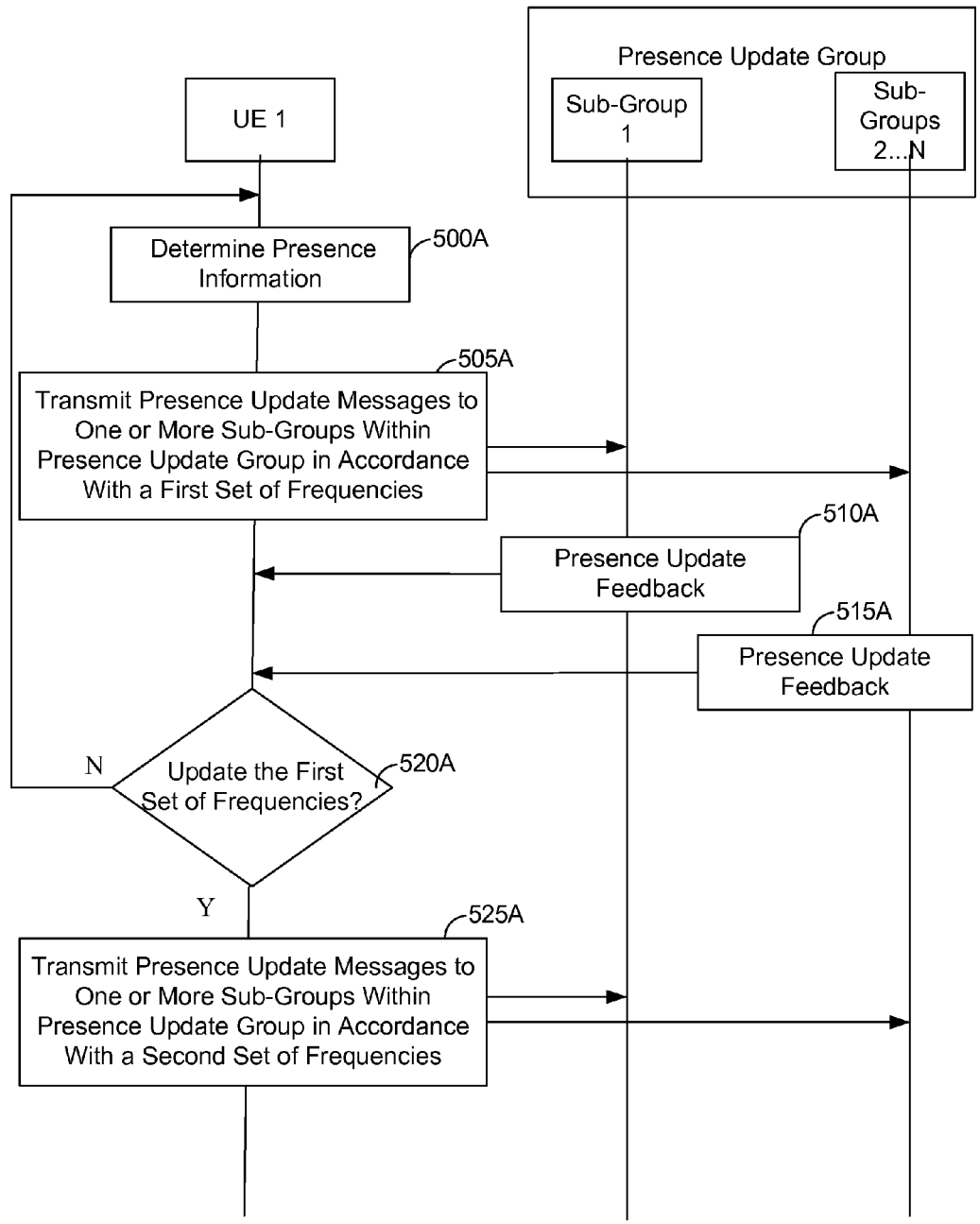
FIG. 4A depicts an example embodiment for updating the frequency of the user devices sending update requests.

FIG. 4A illustrates a process of updating a frequency at which a given user device sends PV update requests.

Referring to FIG. 4A, the given subscriber's user device ("UE 1") determines presence information associated with UE 1 (e.g., UE 1 is busy, UE 1 is available), 500A. The presence information (e.g., PV) determined at 500A can be relative to a particular multimedia application client, such that the presence information determined at 500A is indicative of the given subscriber's presence or availability to participate in communication sessions associated with the multimedia application client (e.g., VoIP communication sessions, PTT communication sessions, etc.). In this example, the target contacts in the Presence Update Group can correspond to contacts of the given subscriber that also use a version of the multimedia application client. In a further example, the presence information can be based on an operational state associated with the multimedia application client (e.g., the presence information can indicate whether the multimedia application client is executing in a foreground or prominent portion of the UE 1's execution environment, whether the multimedia application client is executing in a background or non-prominent portion of the UE 1's execution environment, etc.).

Referring to FIG. 4A, UE 1 transmits presence updates messages to one or more contacts within its Presence Update Group in accordance with a first set of frequencies, 505A. In an example, the presence update messages transmitted at 505A can include (i) the determined presence information from 500A, (ii) requests for presence information feedback from corresponding target contacts to which the presence update messages are transmitted and/or (iii) a combination of (i) and (ii). In a further example, the Presence Update Group may be partitioned into one or more sub-groups, with each of the one or more sub-groups being populated with contacts having a given priority level or being within a given priority level range. A target presence update frequency can then be assigned to each sub-group, resulting in the first set of frequencies at which the presence update messages are transmitted in 505A. For example, a sub-group with high-priority contacts can be assigned a higher frequency as compared to a sub-group with low-priority contacts. In another example, the presence information determined at 500A can affect the first set of frequencies. For example, if the presence information determined at 500A indicates that the multicast application client is executing in a foreground or prominent portion of UE 1's execution environment, the first set of frequencies can be set to a higher level (e.g., for one sub-group, for each sub-group, etc.). In another example, if the presence information determined at 500A indicates that the multicast application client is executing in a background or non-prominent portion of UE 1's execution environment, the first set of frequencies can be set to a lower level (e.g., for one sub-group, for each sub-group, etc.).

In a further example, to reduce network traffic as noted above, the presence update messages can be configured to further request presence information from the targeted contacts or sub-groups. In the example of FIG. 4A, assume that the Presence Update Group includes N sub-groups, where N≥2, and that UE 1 transmits the presence update messages to each contact in each of the N sub-groups in 505A in accordance with the first set of frequencies (e.g., which can vary from sub-group to sub-group as noted above, based on the respective priorities of the sub-groups and/or the contacts within the respective sub-groups, such that UE 1 can transmit presence update messages to sub-group 1 at a first frequency and UE 1 can transmit presence update messages to sub-group 2 at a second frequency, and so on). However, in other examples, UE 1 may transmit presence update messages to a single sub-group (e.g., N=1).

Referring to FIG. 4A, each contact in each of sub-groups 1 . . . N receives at least one presence update message transmitted by UE 1 at 505A and provides presence update feedback to UE 1, 510A and 515A. For example, each contact in sub-groups 1 . . . N receives UE 1's presence update message(s) in accordance with one of the first set of frequencies in 505A, and responds with its own presence update message that updates UE 1 with respect to the presence information (or PV) of the contact providing the feedback.

Referring to FIG. 4A, at some later point in time, UE 1 determines whether to update the first set of frequencies, 520A. For example, in 520A, UE 1 may determine to update the first set of frequencies based on a number of the one or more other contacts (or user devices) to which the update will be sent. In this example, if the number of target contacts has increased above a threshold level, at least one of the first set of frequencies is reduced to maintain system traffic at a manageable level. In an alternative example, if the number of target contacts has decreased below a threshold level, at least one of the first set of frequencies is increased because fewer target contacts permits more presence update messages to be transmitted without increasing overall system traffic.

Referring to 520A of FIG. 4A, in another example, UE 1 may determine to update the first set of frequencies based on an amount of time since a previous presence update message was received from one or more contacts belonging to sub-groups 1 . . . N. For example, UE 1 may determine to increase a given frequency from the first set of frequencies allocated to a given sub-group if the amount of time since a previous presence update message was received from the given sub-group is below a time threshold, and UE 1 may determine to decrease the given frequency if the amount of time since a previous presence update message was received from the given sub-group is above a time threshold.

Referring to 520A of FIG. 4A, in another example, UE 1 may determine a set of priorities associated with sub-groups 1 . . . N (e.g., the priorities of the constituent UEs within the sub-groups, or a priority profile associated with the sub-groups themselves). The determined set of priorities is then used to determine whether to update the first set of frequencies. For example, if the set of priorities indicates that sub-group 1 is associated with a higher priority than sub-group 2 and the first set of frequencies allocates a higher frequency to sub-group 2 than sub-group 1, UE 1 may determine to update the first set of frequencies to produce a second set of frequencies that increases the frequency allocated to sub-group 1 and/or decreases the frequency allocated to sub-group 2.

Referring to 520A of FIG. 4A, in another example, UE 1 may determine to update the first set of priorities based in part upon whether UE 1 is locked. For example, UE 1 determines a type of lock (if any) applied to UE 1 and then determines whether to update the first set of frequencies based on the determined type of lock. This aspect is described below in more detail.

Referring to 520A of FIG. 4A, in another example, UE 1 may determine a duration that UE 1 is expected to remain operating or executing a particular application on UE 1. If the determined duration is greater than a threshold duration, UE 1 may determine to update the first set of frequencies in 520A. In a specific example, UE 1 may determine to decrease one or more of the first set of frequencies based on the determination that UE 1 will be engaged with the application for more than the threshold duration.

Referring to 520A of FIG. 4A, in another example, one or more user devices operated by one or more contacts of the subscriber may not wish to receive and/or transmit presence update messages at the frequency UE 1 determined for them in step 505A. In that case, a contact's user device may transmit presence update feedback to UE 1 that includes a policy indicating that it wishes to receive and/or send presence update messages only at a certain frequency, or no more frequently than a maximum rate. For example, UE 1 may determine in step 505A to send a particular contact's user device a presence update message, including a request for presence information, every ten minutes. That contact's user device, or that contact, however, may determine that it wants to receive and/or send presence update messages to UE 1, or possibly to all of the contacts in its Presence Update Group, only once an hour. In that case, it would send a policy to UE 1 in response to receiving a presence update message from UE 1 indicating that rule. UE 1 would then update the frequency at which it transmits presence update messages to that contact's user device. In another example, UE 1 may determine in step 505A to send a particular contact or group of contacts a presence update message, including a request for presence information, every 5 minutes. One or more of those contact's user devices, or the contacts themselves, however, may determine that they want to receive and/or send presence update messages to UE 1, or possibly to all of the contacts in its Presence Update Group, no more frequently than every 15 minutes (i.e. at a maximum rate of fifteen minutes). In that case, they would each send a policy to UE 1 in response to receiving a presence update message from UE 1 indicating that rule. UE 1 would then update the frequency at which it transmits presence update messages to that contacts' user devices.

Referring to FIG. 4A, if UE 1 determines not to update the first set of frequencies in 520A, the process returns to 500A and UE 1 continues to send presence information to sub-groups 1 . . . N in accordance with the first set of frequencies in 505A. Otherwise, if UE 1 determines to update the first set of frequencies in 520A, UE 1 calculates a second set of frequencies and then transmits the presence update messages to sub-groups 1 . . . N in accordance with the second set of frequencies, 525A. While not shown explicitly in FIG. 4A, the presence update messages transmitted at 525A can also include feedback requests to solicit presence update feedback as discussed above with respect to 505A, 510A, and 515A.

Figure 4B:
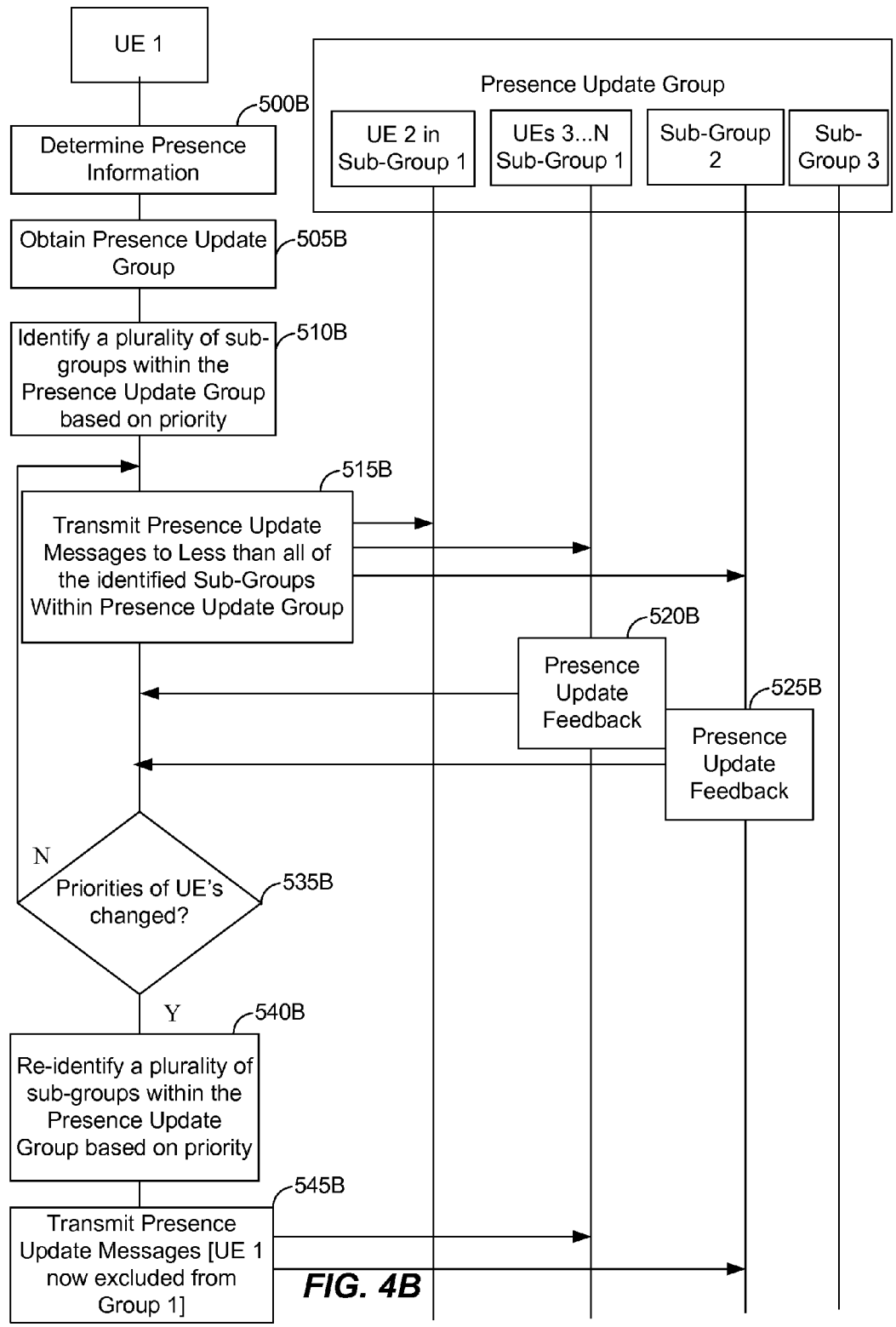
FIG. 4B depicts an example embodiment for updating the number of subscribers maintained in the presence update groups being maintained by the user device.

FIG. 4B depicts a process of updating a number of subscribers maintained in the Presence Update Group being maintained by the given user device in accordance with an embodiment of the invention.

Referring to FIG. 4B, UE 1 determines presence information associated with UE 1 (e.g., UE 1 is busy, UE 1 is available), 500B. In an example, the determination of 500B is similar to the determination of 500A of FIG. 5A discussed above, and as such will not be discussed further for the sake of brevity. UE 1 also obtains a Presence Update Group in step 505B that includes a set of contacts of the given subscriber operating the user device for which the given subscriber is to exchange presence information, such as the presence information determined at 500B. For example, the Presence Update Group may comprise all of the given subscriber's contacts stored in a list of contacts on UE 1. Alternatively, the set of contacts in the Presence Update Group may correspond to a subset of contacts of the given subscriber (e.g., where the given subscriber's presence information is relative to a particular multimedia application client, the subset of contacts can include contacts that also use a version of the multimedia application client).

Referring to FIG. 4B, the contacts in the Presence Update Group may be divided into one or more sub-groups, as discussed above with respect to FIG. 4A, which are identified by UE 1 in 510B. The identification of the plurality of sub-groups at 510B can correspond to (i) an initial generation of the plurality of sub-groups, (ii) a modification or updating to a pre-existing set of sub-groups or (iii) a loading of the pre-existing set of sub-groups at UE 1 (e.g., from local memory or external memory). As discussed above, each of the one or more sub-groups corresponding to contacts having a given priority level or being within a given priority level range. Each sub-group contains one or more contacts, for example, exemplary Sub-Group 1 shown in FIG. 4B contains contacts associated with UEs 2 . . . N, where N≥3 contact.

To generate the sub-groups, each of the contacts in the Presence Update Group is evaluated against a set of one or more criteria and assigned a priority based on the evaluation. For example, the criteria can include a user-assigned priority of the contact, a frequency at which the subscriber and/or UE 1 communicates with the contact and/or a given user device operated by the contact, an amount of time since the subscriber and/or UE 1 previously communicated with the contact and/or the user device operated by the contact, social relationship characteristics between the subscriber and the contact (e.g. work, family, friends, etc.), a likelihood that the subscriber will communicate with the contact within a threshold period of time, and/or an amount of time since UE 1 previously received a presence update message from the user device operated by the contact. Once each contact in the Presence Update Group has been assigned a priority, the contacts are partitioned into sub-groups based on that priority. For example, if the criterion is social relationships, there may be a sub-group of family members, a sub-group of friends, a sub-group of work contacts, and so on. In another example, if the criterion is the amount of time since the subscriber last communicated with a contact, there may be a sub-group of contacts communicated with in the last day, a sub-group of contacts communicated with in the last week, a sub-group of contacts communicated within the last month, and so on.

Referring to 510B of FIG. 4B, in an example, one or more user devices operated by one or more contacts of the subscriber may wish to receive and/or transmit presence update messages at a particular frequency or no more frequently than a particular maximum rate, as discussed with reference to step 520A of FIG. 4A. Knowing that, UE 1 may combine those contacts with the same preferred update frequency or maximum rate into the same sub-groups, then transmit presence update messages to them in compliance with their preferred frequency information.

Still referring to 510B of FIG. 4B, it is appreciated that a particular contact can satisfy the criteria associated with more than one sub-group, referred to herein as a "multi-group contact." For example, the given subscriber may work with his/her brother, which qualifies the brother to be a constituent of both family and co-worker sub-groups. In another example, the given subscriber may have just terminated a phone call with a given contact, which qualifies the given contact to be a constitute in a first sub-group for contacts contacted by the given subscriber within the last week and a second sub-group for contacts contacted by the given subscriber within the last 24 hours. In this case, UE 1 will attempt to assign the multi-group contact to a qualifying sub-group expected to be associated with a highest priority.

Continuing with 510B of FIG. 4B, after the contacts have been divided into sub-groups, UE 1 determines a priority of each sub-group based on the priorities of their constituent contacts. In an example, the sub-groups can be populated with contacts in a particular priority range such that the priority of the sub-groups is already known and the determination of 510B merely determines which sub-groups include at least one contact. In another example, the priority determination of 510B can average the priorities of the constituent contacts of each sub-group to calculate the priority of the sub-group. In either case, a sub-group of higher priority contacts will generally have a higher priority than a sub-group of lower priority contacts. For example, a sub-group of family members may have a higher priority than a sub-group of co-workers (e.g., although these priorities may shift over time, with family members prioritized during the weekend and co-workers prioritized during normal work hours). In another example, a sub-group of contacts with whom the subscriber has communicated within the previous 24 hours may have a higher priority than contacts with whom the subscriber has communicated within the previous week.

Referring to 510B of FIG. 4B, based on the sub-group priorities, a determination is made as to the frequency at which UE 1 will transmit presence update messages to the sub-groups, as discussed above with respect to FIG. 4A with respect to the first and second sets of frequencies. Each sub-group may, but is not required to, be transmitted presence update messages at a different frequency. For example, presence update messages may be transmitted to a sub-group of family members more frequently than to a sub-group of co-workers if the priority assigned to the sub-group of family members is higher than the priority assigned to the sub-group of coworkers.

Further, not all sub-groups must be transmitted a presence update message in accordance with an assigned frequency. For example, after obtaining the sub-group priorities, UE 1 can determine whether any sub-group priorities are below a given threshold and then exclude the associated sub-groups (if any) having a priority below a given threshold from a presence update frequency assignment. For example, a sub-group that was not assigned any contacts will not receive presence update messages. In another example, a sub-group that includes only low priority contacts will not receive presence update messages. In FIG. 4B, Sub-Group 3 is provided as an example of a sub-group that does not receive presence update messages from UE 1.

Referring now to 515B of FIG. 4B, UE 1 transmits at least one presence update message to each contact in each of Sub-Groups 1 and 2. While not shown explicitly in FIG. 4B, the transmission(s) of 515B can be performed in accordance with each sub-group's respective frequency, as shown in FIG. 4A. In an example, the presence update messages transmitted at 515B can include (i) the determined presence information from 500B, (ii) requests for presence information feedback from corresponding target contacts to which the presence update messages are transmitted and/or (iii) a combination of (i) and (ii). In the example embodiment shown in FIG. 4B, each contact except UE 2 provide presence update feedback to UE 1 at 520B and 525B. This may occur if UE 1's presence update messages only requested presence information feedback from the other contacts, and/or if UE 2 either did not receive UE 1's presence update message or chose not to respond to UE 1's presence update message (e.g., a user of UE 2 has blocked presence update transmissions, etc.).

Referring to 535B of FIG. 4B, a determination is made as to whether the priority of any contacts and/or sub-groups have changed. If no priorities have changed, the process returns to 515B and UE 1 continues to transmit presence update messages to the previously determined sub-groups of contacts (i.e., Sub-Groups 1 and 2) at the previously determined frequencies. If the priorities of any contacts and/or sub-groups have changed, referring now to 540B, UE 1 re-calculates or updates the sub-group formations. For example, in 540B, UE 1 may transfer contacts between different sub-groups and/or remove contacts from the Presence Update Group entirely.

In the example shown in FIG. 4B, UE 2 did not respond to UE 1's presence update message. As such, a priority level associated with UE 2 may be lowered, resulting in UE 2 being removed from Sub-Group 1 and also from the Presence Update Group. In another example, a contact with whom the subscriber has not communicated in a day may become a contact with whom the subscriber has not communicated in a week (e.g., a contact inactivity timer for a particular contact, such as UE 2, may have just passed the 24 hour mark, etc.), and thus that contact would be reassigned to the appropriate sub-group. In yet another example, a contact who is no longer a friend of the subscriber would be removed from the sub-group corresponding to friends of the subscriber (e.g., based on an assessment that the given subscriber has changed a social status of the contact from friend to non-friend), or a friend could become a family member through marriage. As noted above, a contact removed from a particular sub-group can either be removed from the Presence Update Group entirely (e.g., the previous friend who is no longer a friend is removed entirely) or simply transferred from one sub-group to another sub-group based on the respective change in priority of the contact (e.g., the friend who is now a family member can be moved to a higher-priority sub-group). In another aspect, if the priorities of enough contacts in a given sub-group change, the overall priority of that sub-group could change. For example, if the priority criterion is a threshold period of time elapsing without communication between the subscriber and the contacts in a given sub-group, for example a sub-group of co-workers, and that threshold is crossed because the subscriber is on vacation, the priority of those contacts and thus the sub-group could be reduced. UE 1 would send presence update messages at a lower frequency than it had been in response to the reduction in priority.

In another example, one or more user devices operated by one or more contacts of the subscriber may wish to receive and/or transmit presence update messages at a particular frequency or no more frequently than a particular maximum rate, as discussed with reference to step 520A of FIG. 4A. At some point, however, one or more of those contacts may change its preferred frequency and inform UE 1 of the change through presence update feedback. Such a change would constitute a priority change for purposes of step 535B and require UE 1 to re-identify the plurality of sub-groups within the Presence Update Group, as shown in step 540B.

Referring to 545B of FIG. 4B, UE 1 transmits presence update messages to the updated sub-groups. As shown, UE 2 is not transmitted a presence update message. If at some point UE 1 receives a response from UE 2, UE 1 may reevaluate the priority assigned to UE 2, as discussed with reference to 535B. In other words, UE 2's removal from the Presence Update Group need not be permanent.

Figure 5:
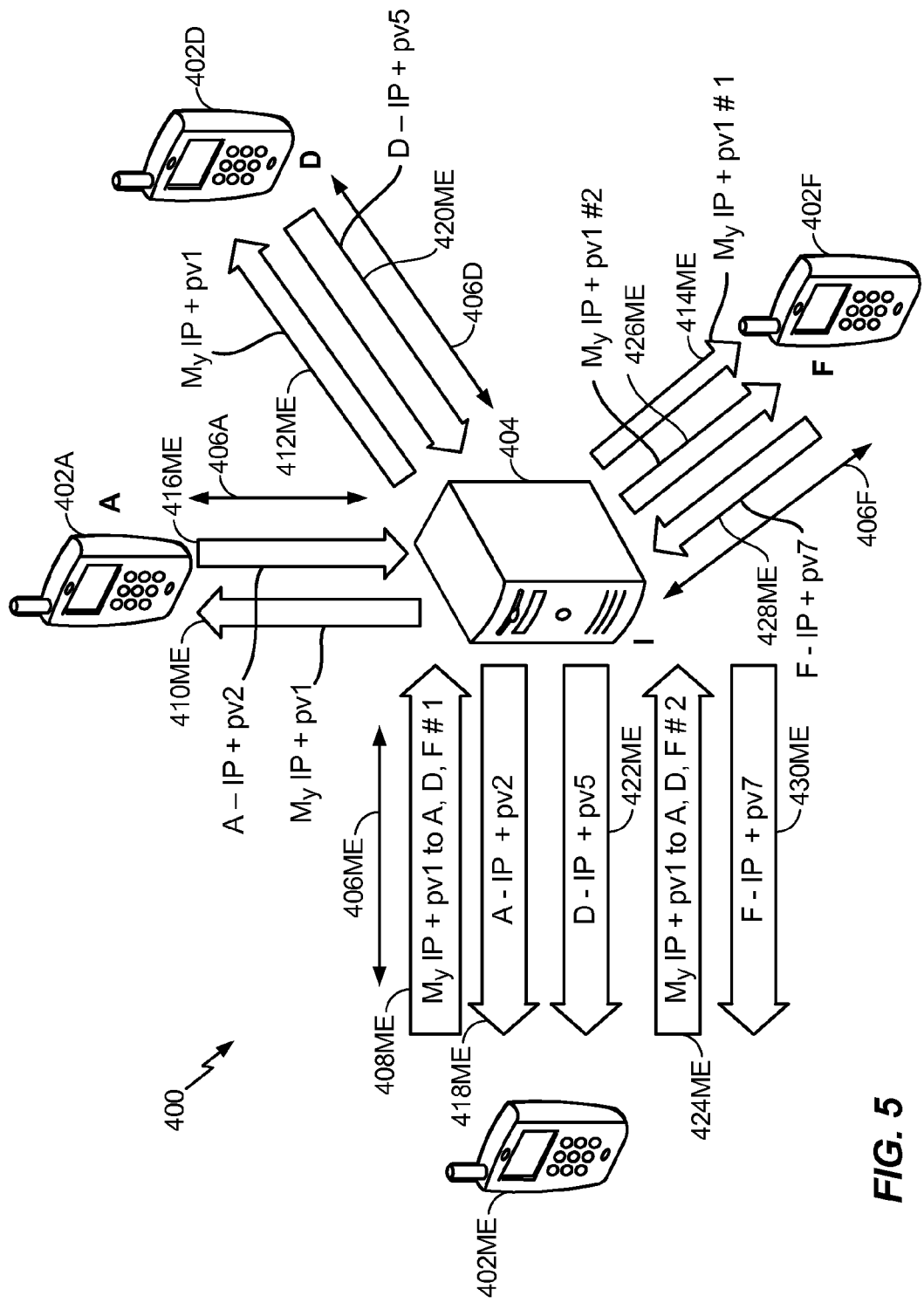
FIG. 5 is a functional block flow diagram showing one example presence method according to at least one embodiment.

Referring now to FIG. 5, further aspects of the one or more example embodiments of FIGS. 4A and B will be described. FIG. 5 shows an example flow block diagram 400 of a network according to one or more embodiments. FIG. 5 illustrates a representative example of a hypothetical subscriber user named "ME" having his/her user device 402ME, interconnected with three other subscriber user devices, labeled 402A, 402D and 402F interconnected through a server (or distributed server resource) 404 via client-to-server links 406ME, 406A, 406D, and 406F. The user devices 402ME, 402A, 402D and 402F are referenced generically as 402, and the client-to-server links 406ME, 406A, 406D, and 406F are referenced generically as 406.

It will be understood that the client-to-server links 406 are not necessarily specific to the disclosed embodiments. As one illustrative example, the client-to-server links 406 may be a control channel within a wireless network protocol. This is only one example, and is not intended as any limitation on the scope of implementations. Further, it will be understood that each FIG. 5 "link" 406 is a functional aspect, and not necessarily a single link, or any particular physical link. Persons of ordinary skill in the art, upon reading this disclosure, will understand this and can readily select appropriate media and protocol(s) for implementing client-to-server links 406, or equivalents. Further detailed description of the links 406 is therefore omitted.

Continuing to refer to FIG. 5, various stages or steps of message transmission for one updating operation initiated by the user device 402ME are shown. It may be assumed that the described messages travel on the illustrated client-to-server link 406. However, it will be understood that one or more of the messages, e.g., the PV update request 408ME sent by the user device 402ME, may be communicated over alternate links (not shown in FIG. 5).

In the FIG. 5 example 400, the PV update request 408ME sent by the user device 402ME (as depicted in 505A of FIG. 4A and 515B of FIG. 4B) includes the PV of that user device 402ME at the time PV update request 408ME is sent (as depicted in 500A of FIG. 4A and 500B of FIG. 4B). For purposes of example, the PV of the user device 402ME will be termed "pv1." Similarly, it will be assumed that "pv2," "pv5," and "pv7" are the respective PV values sent by, and associated with, the user devices 402A, 402D and 402F, and that these PVs characterize the respective communication status of these user devices.

Still referring to FIG. 5, the PV update request 408ME identifies the subscriber "ME" with a field value labeled "MyIP." It may be assumed that MyIP includes an identifier unique to the subscriber ME and, for purposes of illustration, includes ME's IP address. It will be understood that for purposes of practicing embodiments as illustrated at FIG. 5 the IP address is not necessary. Likewise, the responses that the user devices 402A, 402D and 402F send after receiving the PV update request 408ME (e.g., such as 510A and 515A in FIG. 4A or 520B and 525B in FIG. 4B) are shown as having the sender's IP address and, also likewise, these IP addresses are not necessary for practicing embodiments as illustrated at FIG. 5.

The PV update request 408ME has, in addition to the previously described "MyIP" field and "pv1" field characterizing subscriber ME's communication status, target addresses A, D and F. It may be assumed that the reason the targets are the user devices 402A, 402D and 402F is that the A, D and F subscribers are in the Presence Update Group maintained by the user device 402ME. For purposes of understanding the concepts depicted at FIG. 5, though, the specific reasons for 402ME sending PV update request 408ME to user devices 402A, 402D and 402F are irrelevant.

Continuing to refer to FIG. 5, the PV update request 408ME enters the server 404 and, in response, the server 404 transmits the PV update request as 410ME to the user device 402A, as 412ME to the user device 402D, and as 414ME to the user device 402F. The user device 402A responds to the PV update request message 410ME by sending response message 416ME (e.g., such as 510A and 515A in FIG. 4A or 520B and 525B in FIG. 4B), having the user device 402A's pv2 presence value, and the server 404 forwards this as PV response message 418ME to the user device 402ME. Similarly, the user device 402D responds to the PV update request communication 412ME by sending its pv5 presence value in the PV response message 420ME, which the server 404 forwards as PV response message 422ME to the user device 402ME (as depicted in 510A and 515A of FIG. 4A and 520B and 525B of FIG. 4B).

In the FIG. 5 example 400, the user device 402F is shown as not responding to the PV update request communication 414ME (e.g., as depicted by UE 2's failure to respond to UE 1's presence update message from 515B in FIG. 4B). This failure to respond may be caused, for example, by the user device 402F having low reception quality. In one aspect, the user device 402ME (and other user devices as well) has a mechanism for detecting this and subsequent failures to receive a response. For purposes of illustration, user devices 402 may set a timer when a PV update request is sent and, if the time expires, re-send the request. In one aspect, the user's devices may have a maximum number of retries and, if the number is exceeded, designate in the user device Presence Update Group that the target user device is UNAVAILABLE (as depicted in 535B of FIG. 4B). In the FIG. 5 example 400 the user device 402ME sends the resend PV update request as 424ME to the server 404, and the server 404 forwards to the user device 402F as PV update request communication 426ME. In this instance, the user device 402F does respond, with PV update response message 428ME, and the server 404 forwards this PV update response message 428ME as 430ME to the user device 402ME. The user device 402ME now has an updated Presence Update Group, reflecting the pv2, pv5 and pv7 values it received from the user devices 402A, 402D and 402F.

In one aspect, the user devices 402 may include a mechanism to distinguish between received PV update requests and received responses to their own PV update requests, based on inspection of these messages. For example, the user devices 402 may apply a format to their PV update requests that is different from the format they apply to their responses to PV update requests received from other subscribers' user devices. In one aspect, the user devices 402 may be configured to include a bit field in both their PV update requests and their responses to PV update requests, and to set a bit value within that field as a flag differentiating between PV update requests and responses to PV update requests. For example, such a bit field may be a single bit width, and a flag scheme may assign a value of logical "1" for PV update requests and a logical "0" for responses to PV update requests. Referring to the FIG. 5 example to illustrate, one benefit of such forming of a PV update request to be distinguishable on its face from a response to a PV update request is that a user device such as 402ME, by simple inspection of a received message such as the PV response message 418ME sent by the user device 402A, will not interpret that response message 418ME as a PV update request sent by the user device 402A. It is conceivable, at least in this example, that such a misinterpretation could result in the user device 402ME sending a response to that PV response message 418ME back to the user device 402A. It is also conceivable that, at least in a hypothetical construction in which the user devices 402 have no other mechanism for distinguishing between PV update requests and responses to PV update requests, an unacceptable back-and-forth messaging could potentially result.

It will be understood that the above-described use of a flag is only one example of a mechanism to prevent, or otherwise obviate the possibility of, the user devices 402 responding to responses to their own PV update requests. Persons of ordinary skill in the arts pertaining to these embodiments will be able, upon reading this disclosure or practicing according to its embodiments, to identify various alternate means and methods.

As previously described, the user devices 402 may be configured to apply various different triggering events for sending PV update requests to target the user devices 402. One example trigger event may be a timeout, using as a reference a given maximum permitted time for the user device to maintain an entry in its Presence Update Group for another subscriber's user device, without the PV for that entry being updated (as depicted in 535B of FIG. 4B). In one aspect this may be a default timeout. In another aspect the user device may be configurable to apply different timeouts to different ones of the subscriber user devices in its Presence Update Group (as depicted in 510B of FIG. 4B). Further to this aspect, a user device may be configured to select the particular timeout it applies to each subscriber's user device in its Presence Update Group based on the type(s) of communication(s) the user device is currently having, or recently had, with that subscriber's user device.

As one illustration of a timeout based sending of PV update requests, assume the user device 402ME of the FIG. 5 example 400 is in communication, through his/her user device 402ME with the user device 402A. It will therefore be assumed that the user device 402ME's Presence Update Group has an entry for the user device 402A. Assume that at time T0 the user device 402ME receives an update of the user device 402A's PV value. In the FIG. 5 example this is pv2. This update that 402ME receives at time T0 may be in response to a PV update request that the user device 402ME earlier sent to the user device 402A. Alternatively, the user device 402ME may have received the updated pv2 in a PV update request (not explicitly shown in FIG. 5) sent by the user device 402A. Next, assume the user device 402ME applies a timeout value of EX for its updating the entry for the user device 402A in its Presence Update Group. Therefore, if at time T0+EX the user device 402ME has not received another PV update from the user device 402A, the user device 402ME will automatically send a PV update request to the user device 402A.

In one aspect the user device 402ME may then wait for a reply from the user device 402A. For example, the user device 402ME may, in conjunction with sending the PV update request to the user device 402A, set another timer with a "wait for reply" timeout. Alternatively, the user device 402ME may simply use the same timer and same timeout that it used for determining when to first send this PV update request to the user device 402A. In other words, if at time T0+EX the user device 402ME sends the above-described PV update request it resets the timer (either to zero or to EX, depending on whether an incrementing or decrementing counter is used).

Continuing with the above example scenario of the user device 402ME updating the pv2 that it was storing for the user device 402A, it will be understood that in one aspect all the user devices 402 may be similarly configured, at least with respect to their schemes for updating their Presence Update Group to reflect updated PVs of other subscribers' user devices 402. Therefore, since the user device 402ME at T0 was in communication with the user device 402A then, from the user device 402A's point of view, it was in communication with the user device 402ME. Thus, at time T0 the user device 402A was maintaining its local stored copy of the PV value pv1 of the user device 402ME, and was also applying a scheme (which may or may not be identical to the scheme applied by the user device 402ME) for updating, its local stored pv1 of the user device 402ME. Therefore, whichever among the user devices 402ME and 402A first reaches its own timeout value with respect to the PV it stores for the other (or whichever of these user devices 402ME, 402A first experiences another type triggering event for sending its own PV to the other, prior to timeout by the other) will be the user device 402 that first sends the PV update request.

It will be understood that the contemplated example scenarios according to the present embodiments may provide, referring for purposes of illustration to the FIG. 5 example 400, thousands and thousands of the user devices such as 402 being interconnected (e.g., through a server or server resource such as 404) at any given time. It is further contemplated that thousands of subscriber-to-subscriber communications through their respective user devices 402 may be extant at any given instant, many of which may be multi-member, multi-participant or multi-attendee groups. It will therefore be appreciated, when establishing specifications and rules for the setting of timeouts and other factors that each user device 402 applies for determining when to send their respective PV update requests that such scenarios may be taken into account. As will be readily understood by persons of ordinary skill in the pertinent arts from this disclosure, one general guideline for establishing such specifications and rules is the following: if the user devices maintain too many other subscriber PVs, and/or the user devices send PV update requests too often, then one or both of the user devices or the network may be unnecessarily overloaded. As one additional example of such overload, it will be readily appreciated that timeouts being too short may increase the likelihood, especially in a group communication, of multiple participants' user devices unnecessarily sending PV update requests to other participant devices. Also, as will be further understood from the detailed description in reference to FIGS. 6 and 7, if too many subscriber PVs are being maintained by a user device a result may be that displaying these PVs on that user device will become impractical. If, on the other hand, the user devices maintain too few other subscriber PVs, and/or do not update these PVs often enough, then too many communications may be sent to unavailable or no-longer-participating subscribers.

Further to the above considerations and scenarios, one or more example embodiments provide for throttling and other adaptivity of the number of subscribers maintained in the Presence Update Groups being maintained by the user device, as depicted in FIG. 4B, and of the frequency of the user devices sending PV update request, as depicted in FIG. 4A.

In one aspect according to at least one of such example embodiments, the user devices may be configured to increase the timeout value (i.e., increase the maximum permitted time between PV updates) in relation to the number of PVs the user device is maintaining (as depicted in 505A, 520A, and 525A of FIG. 4A). Stated differently, according to one such aspect the longer the Presence Update Group the longer the time between PV update requests being sent. Further to this one aspect, the user devices may be configured to increase (incrementally or threshold step-wise) the timeout for PVs of other subscribers in large groups. The respective group size thresholds for increasing the timeout may be fixed independent of the type of communication, or may be further adaptable to be based on the type of communication (e.g., whether a group is playing an interactive game).

In another throttling aspect, a threshold "time since last communication" or equivalent by which other subscribers are deleted from the user device's Presence Update Group may be reduced in correspondence with an increase in the length of the Presence Update Group. In other words, the criteria of a communication time-based sub-group can be modified, which may occur at 535B of FIG. 4B, in an example.

In one aspect further to the above adaptive "time since last communication," the user devices may be configured to categorize the Presence Update Group into sub-groups based on each PV's associated "time since last communication" (as depicted in steps 510B and 515B of FIG. 4B), and to apply larger timeout values to sub-groups having a longer "time since last communication" (e.g., as depicted in steps 535B, 540B, and 545B of FIG. 4B).

In one throttling aspect, the other subscribers in the Presence Update Group of a user device may be categorized according to one or more characteristics of the particular listed subscriber. For example, a Category 1 (or Sub-Group 1) may be important business contacts, a Category 2 (or Sub-Group 2) may be persons that, in relation to the subscriber whose user device is maintaining such the Presence Update Group, may not require as accurate (i.e., recently updated) of a PV.

For a similar objective of reducing unnecessary message traffic on the network a user device may be configured, as previously described, to cease performing Presence Update Group updating when that user device is locked. This may also conserve the user device's battery power. In one aspect a user device may have multiple lock modes, and such a user device may be configured to determine whether to cease performing Presence Update Group updating based on which of the lock modes the user device is placed in. For example, as previously described, the user device may have one lock mode for preventing unauthorized persons from using the device and inadvertent key disabling lock mode for preventing inadvertent key pressing that may occur when placed in a user's pocket. A user device according to this aspect may be configured to provide the subscriber with an option of maintaining Presence Update Group updating while the user device is in the inadvertent key disabling lock mode. In context with FIG. 4B, when the user device is locked, the determination of 535B will result in a return to 515B instead of advancing to 540B and 545B even if the priorities of the constituent contacts and/or sub-groups are determined to have changed.

In another aspect, also previously described, a user device may be configured to reduce its frequency of, or to cease sending PV update requests when the subscriber is in an application in which he/she is likely to remain for an extended duration, e.g., a media player or game (e.g., determined at 520A of FIG. 4A, in an example).

In one aspect, at a triggering event such as a subscriber initiating a networking application according to the embodiments, the subscriber's user device may present an initial display reflecting the content (if any) of its Presence Update Group (e.g., as depicted in step 505B of FIG. 4B). In one aspect, these may be other subscribers with which this subscriber has recently communicated. In a related aspect, these may be other subscribers with which this subscriber has a still ongoing communication but, as one illustrative example, was forced to temporarily exit the networking application and attend to another matter.

Presence information is generally only relevant for a very short period of time. Thus, in another aspect of the invention, presence information is stripped from presence update messages that cannot be delivered or are not deliverable. Further, presence update messages may be omitted from the network history. That is, presence update messages that would normally be queued in the network history may be either omitted or only stored for a short period of time compared to non-presence update messages.

Figure 6:
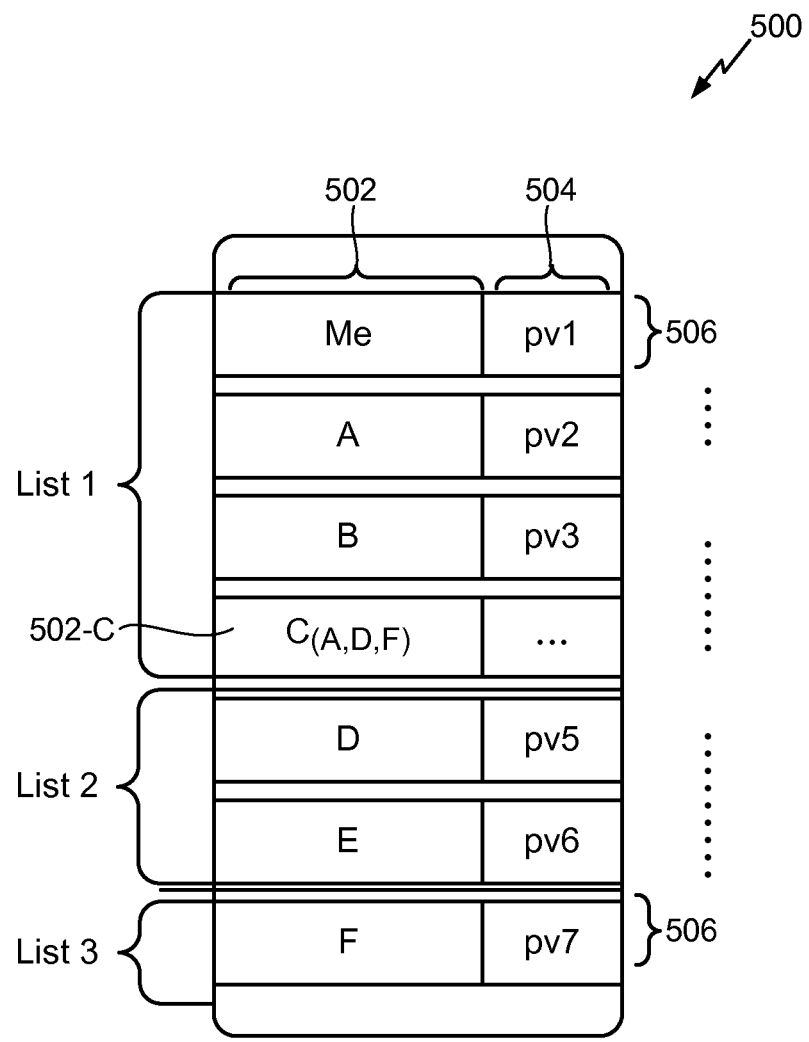
FIG. 6 shows one example of organizational scheme for local monitoring of active subscriber status, for practicing according to one or more example embodiments.

FIG. 6 shows one example Presence Update Group 500, having a plurality of records 506, each record having a subscriber name field 502 and corresponding subscriber PV field 504. It will be understood that the FIG. 6 Presence Update Group 500 represents a time snapshot. More specifically stated, in one aspect a Presence Update Group such as the FIG. 6 example 500 dynamically updates to reflect current and recent communications, including groups in which the subscriber is currently a member or participant, and as well as groups in which the subscriber is no longer an active member, but has a likelihood of follow-on communication with its current (or previous) members. It will be understood that the number of records 506 appearing in the FIG. 6 example is not necessarily representative of an actual number, or an actual relative number between groups and individual other subscribers, that would appear in a given user device's list of other subscribers such as the Presence Update Group 500. As can be readily understood by persons of ordinary skill in the art from this disclosure, the actual number may vary significantly among different subscribers, as well as vary based on, or in correlation with factors such as the time of day or the weather.

The FIG. 6 example Presence Update Group 500, in its depicted state, has a record 506 for the subscriber associated with the user device storing this list, and has a record 506 for each of five other subscribers, these having subscriber name field values of "A," "B," "D," "E" and "F." The example Presence Update Group 500 also has one sub-group element named "C." It will be understood that "A" . . . "F" may be actual names or may be monikers. The record 506 for each individual subscriber in the Presence Update Group 500 has an associated PV value in its field 504. The record for sub-group element C does not have a PV value. The reason, as will be readily understood by persons of ordinary skill in the relevant art, is that a sub-group element C does not have a unitary communication status, at least with respect to being reachable through the user device. The subscriber associated with the user device storing the FIG. 6 example Presence Update Group 500 does, however, know the PV for each member of sub-group C. Stated more specifically, the Presence Update Group 500 indicates in its subscriber name field 502-C the name of its member subscribers A, D, and E, and all of these and their respective PVs also appear in the list. Accordingly, sub-group element C is an example whereby a constituent contact within a particular sub-group can actually correspond to an abstract, or grouping, of contacts, and need not be a specific, single contact.

The FIG. 6 example Presence Update Group 500 shows an example grouping of the Presence Status records 506 into a Sub-Group 1, Sub-Group 2, and Sub-Group 3. An example according to one aspect will be described in reference to FIG. 7, using these example sub-groups. As previously discussed, parameters by which Sub-Groups 1, 2 and 3 may be maintained are recency of communication, various characterizations of the other subscribers (e.g., important business contact or less important entity), and alphabetical order.

Figure 7:
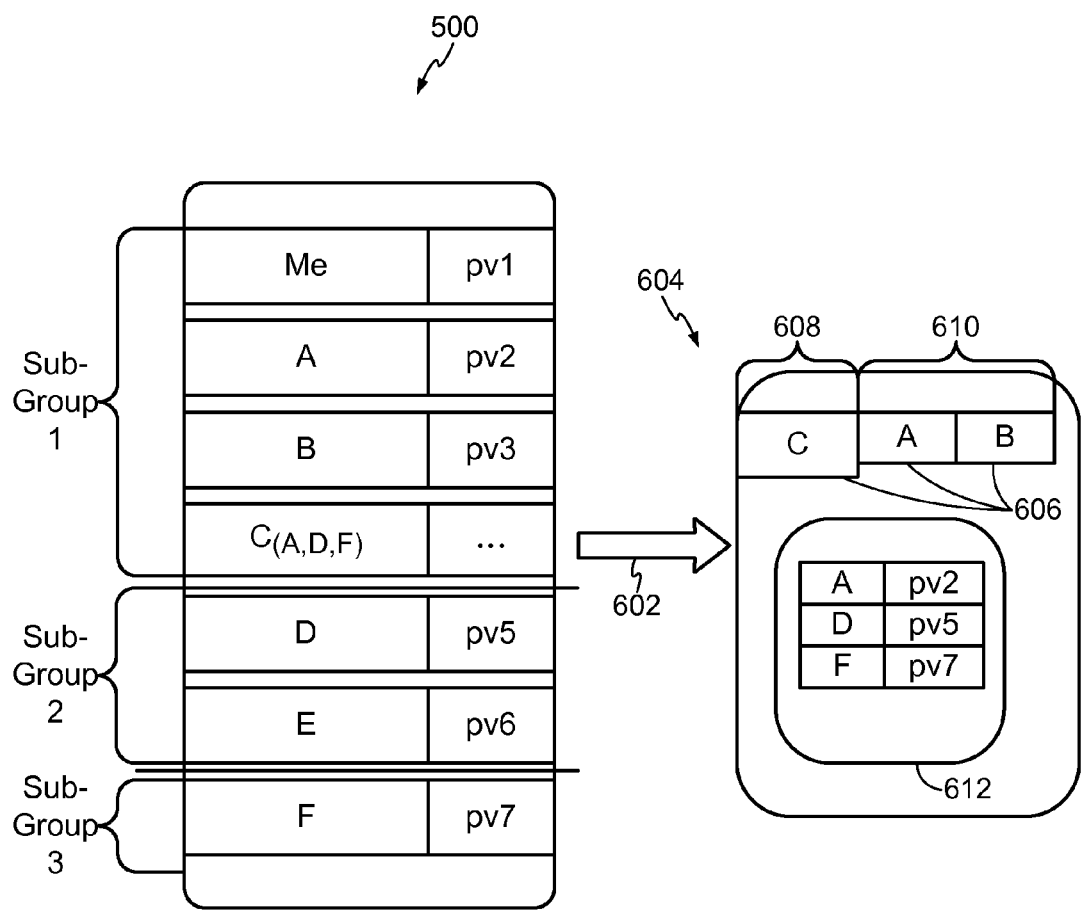
FIG. 7 shows one example of a local display scheme for practicing according to one or more example embodiments.

FIG. 7 shows in conjunction with the FIG. 6 example Presence Update Group 500 one example display scheme 604 of a local display scheme for presenting information from such a Presence Update Group to the subscriber having the user device.

The FIG. 7 example display scheme 604 will assume a user device configured (initially or by the subscriber) to display in active screen areas 606 only subscribers in Sub-Group 1 of the Presence Update Group 500. Accordingly the active screen area 606 shows subscribers A and B, and sub-group element C. In one aspect, one or more of the active screen areas 606 may be highlighted by color, brightness or, as depicted in the FIG. 7 example, by a foreground versus background arrangement. A default highlighting or other designation scheme may be used, or one or more of the active areas may be selected on-the-fly by the user, e.g., using a single tap to designate. In the FIG. 7 example, the sub-group element C is set as a foreground 608, while the remaining Sub-Group 1 subscribers are in the background area 610. In one aspect, a user device may be configured so that the user designating a group such as the example sub-group element C affects a selection 602 of status information from the Presence Update Group 500 characterizing the sub-group element C, which may be displayed on a detailed display area such as 612 that is described in later sections.

It will be understood that the FIG. 7 example display scheme 604 and its background-foreground feature is not the only manner according to these embodiments for the user device to inform the subscriber, or to maintain for the subscriber's convenient retrieval, information on other subscribers in the Presence Update Group 500. For example, a user device according to these embodiments may be configured to present only one of the other subscribers from the Presence Update Group 500 and, in one aspect, may inform the subscriber that additional other subscribers or groups from the Presence Update Group 500 are "on-deck." On one further aspect, the subscriber may have the user device display the "on-deck" subscriber(s) and/or group(s). In one further aspect, a user device according to these embodiments may select as "on-deck" other subscribers or groups from the Presence Update Group 500 with whom the subscriber has a higher estimated likelihood of wishing communication, based on factors such as the type of communication (e.g., voice, image, interactive activity), recency of communication, subscriber history.

Referring again to FIG. 7, in one aspect, the user device may be configured to display information about a sub-group and/or about an individual subscriber. This may be by a default setting or by on-the-fly input from the user. As previously described, in one aspect the above-described highlighting or other designation scheme may also cause the user device to select 602 and display such information. FIG. 7 illustrates an example of this aspect by a detail display region 612 that displays the members of sub-group element C. In one aspect, the user device may be configured to display members who, apart from the sub-group element, are not in Sub-Group 1. This is illustrated in the FIG. 7 example, as group C members D and F appear in the detail display region 612 regardless of these subscribers D and F being in Sub-Group 2 and Sub-Group 3, respectively.

FIG. 7 shows one example display of portions of a Presence Update Group from a subscriber who may have had no interrupting events, such as loss of coverage or user device crash.

In one aspect the user device may be configured to have schemes for an initial display of Presence Status information, after such an interruption.

In one such initial display aspect, an initial display may be configured as an "Optimistic Presence," in which upon a triggering event such as power-up or re-boot the user device will initially present the last valid display, e.g., the display the subscriber was looking at when the battery level caused his/her device to shutdown. The user device will then send out PV update requests, receive PV update requests from other subscribers, and respond to such PV update requests until a new valid state is attained.

In another initial display aspect, the user device initial display may be configured as a "Pessimistic Presence," in which upon a triggering event such as power-up or re-boot the user device will initially present the subscriber with all contacts in his/her address books being "unavailable" absent receipt of a new PV.

Figure 8:
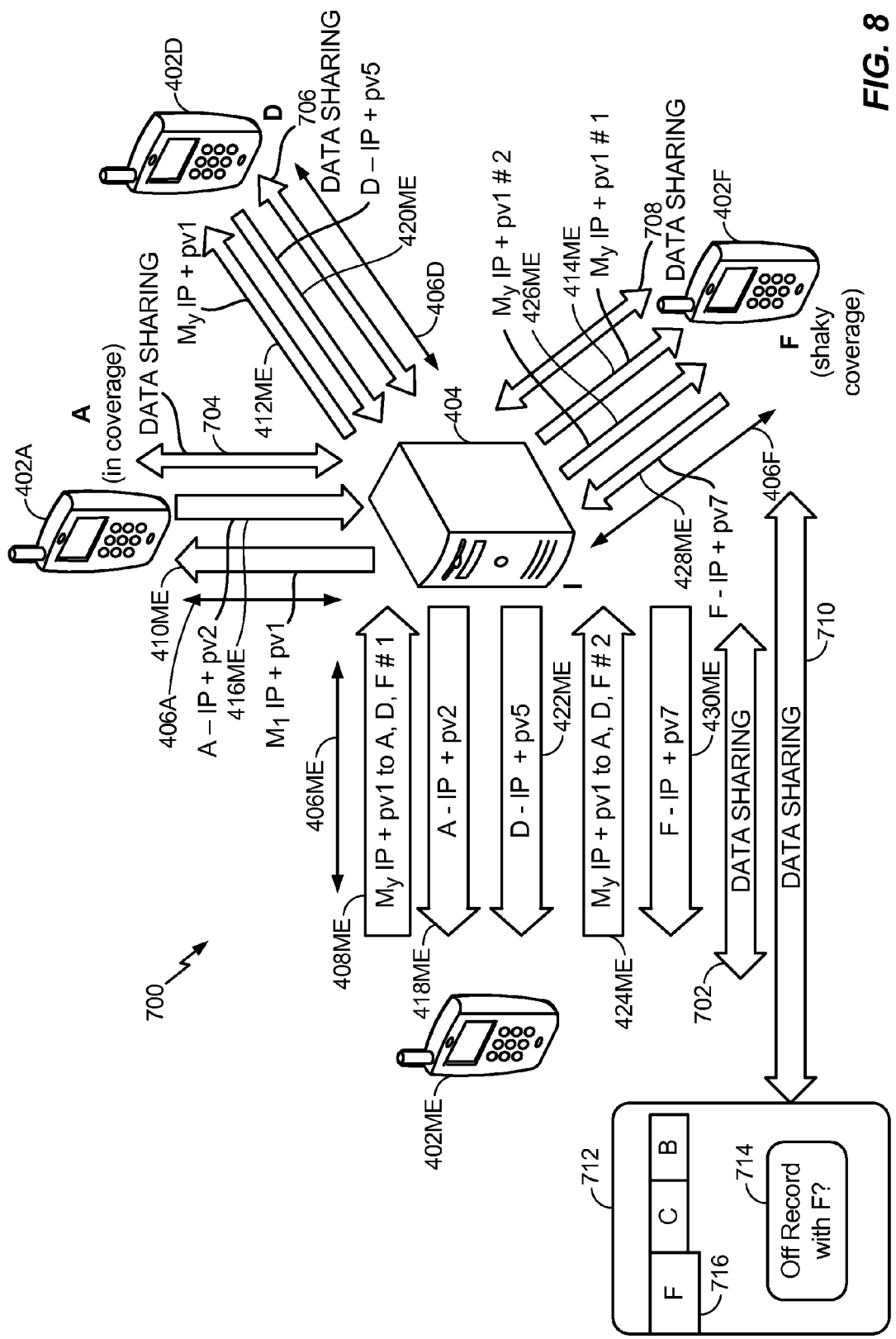
FIG. 8 is a functional block flow diagram showing one example presence method according to at least one embodiment, combined with a functional flow of one method according to one "off the record" aspect.

Referring again to the FIG. 5 example functional block flow 400, this figure depicts only an example PV update request from the user device 402ME to the user devices 402A, 402D and 402F, and has no explicit depiction of other communication among these user devices 402. Such communication may include data, and the data may include voice, image, text and, in one aspect, the user device coordinate data. The media, link and protocol for communicating such data are not necessarily specific to practicing distributed, client-side presence management according to these embodiments. Referring to FIG. 8, such data sharing may be mediated through the server 404, as shown by the example user device to server data sharing links 702, 704, 706 and 708.

FIG. 8 shows another aspect according to one or more embodiments, which will be referred to as the "off-the-record" aspect. To more particularly focus on concepts of the off-the-record aspect, the depicted example 700 incorporates the FIG. 5 example functional block flow 400. It will therefore be understood that the FIG. 8 blocks, links, and message flows that are not labeled may be identical to the corresponding blocks, links, and messages shown at FIG. 5.

As was described in reference to FIG. 5, in one aspect PV update requests such as the example PV update request 408ME may include the IP address of the sender. The example PV update request (e.g., 505A and/or 525A of FIG. 4A, 515B and/or 545B of FIG. 4B, etc.) includes the IP address of the user device 402ME as MyIP. Likewise, all target user devices include their IP address back in their respective responses (e.g., 510A and/or 515A of FIG. 4A, 520B and/or 525B of FIG. 4B, etc.) to other user device's PV update requests. For example, in FIG. 5 the response 420ME sent from the user device 402D back to the user device 402ME includes as "D-IP" the IP address of the user device 402D.

It will be understood that in subscriber user device scenario such as that represented by FIG. 5 each subscriber's user device can theoretically obtain the IP address of each other subscriber's user device with which that user device has communicated (e.g., assuming there are no lost packets, and privacy settings at each user device permit sharing of presence information, and so on).

In one aspect, one or more subscribers may utilize one another's IP address to establish a data sharing links outside of the server 404, i.e., "off-the-record" with respect to that server. FIG. 8 shows one example 710 of such an "off-the-record" link. According to one additional aspect, the user devices may be configured to prompt the subscriber to establish such "off-the-record" links. For example, as shown in the FIG. 8 display 712 the user may highlight, or bring to the foreground, an image field representing another subscriber, e.g., the image field such as 716 representing subscriber F and, in response, the user device may prompt with a request, as shown by the example request 714.

In the previously described reference to the FIG. 5 example showing the user device 402ME sending a PV update request 408ME (e.g., 505A and/or 525A of FIG. 4A, 515B and/or 545B of FIG. 4B, etc.) to the target user devices 402A, 402D and 402F, the 408ME communication is first sent, at time T0, over link 406ME to the server 404. Referring first to the user device 402A, the server 404 forwards that PV update request 408ME over link 406A to the user device 402A, as PV update request message 410ME, to which the user device 402A responds, over the same link 406A, with PV update request response message 416ME (e.g., 510A and/or 515A of FIG. 4A, 520B and/or 525B of FIG. 4B, etc.), and the server 404 in turn forwards this over the described link 406ME, as PV update request response message 418ME.

Referring now to FIG. 8, assume that in the above example a data sharing link was already established, at time T0, between the user device 402ME and the user device 402A. Assume the established data sharing link is formed by, for example, the user device 402ME to server 404 data sharing link 702 and the user device 402A to server 404 data sharing link 704. Next, assume the session for the data sharing is, for example, an active media sharing and, further, that at time T0 the user device 402ME is performing (through the example data sharing links 702, 704) a data push to the user device 402A. It will be understood that practice according to these aspects may be performed with data sharing sessions other than an active media session, and that the active media session is only for purposes of illustration of concepts.

According to one aspect, when a triggering event occurs in one of the contacts in a data sharing session to send a PV update request to another of the contacts (e.g., for example, such as a timer indicating that a transmission time for sending the PV update request has occurred to satisfy the associated frequency at which the PV update requests are to be transmitted), the data sharing link may carry that PV update request. In the example above of the user device 402ME and the user device 402A, instead of the PV update request 408ME sent at time T0 going over link 406ME, it may be embedded in the multimedia session data the user device 402ME is pushing (e.g., 505A and/or 525A of FIG. 4A, 515B and/or 545B of FIG. 4B, etc.), through data sharing links 702 and 704, to the user device 402A. The user device 402A may, in turn, embed its response (e.g., 510A and/or 515A of FIG. 4A, 520B and/or 525B of FIG. 4B, etc.) in the acknowledgement (e.g. ACK) message it sends back to the user device 402ME.

It will be understood that according to this aspect the timers in both of the contacts in the data sharing session must reset their respective updating timers for the other. In other words, the receiving user device can, upon receiving the embedded PV update request from the second user device, reset its timer for that device. Likewise, the sending (now actually a receiving) user device can, upon receiving the requested updated presence PV embedded in, for example, the ACK message from the receiving (now actually sending) user device, reset its updating timer for that receiving user device.

In one aspect the user devices may be configured to determine, while in data sharing sessions with one another, which channel, link or mode of communication to use (i.e., data sharing link such as 702, 704, 706 and/or 708, or control or other link, e.g., 406ME, 406A, 406D and/or 406F), to use for sending the PV update requests. Rules and thresholds for making such decisions may be application-specific and/or may be environment specific. As will be apparent to a person of ordinary skill in the pertinent art after reading this disclosure, determining factors for which channel or link may more practically carry presence updating information according to these embodiments may include the following: i) the size of the presence updating communications, and ii) whether the data session is a high performance signaling or a best effort signaling.

More specifically, in high-performance signaling sessions carried on common channels the data communications can be associated with a maximum or threshold size budget. In such sessions, the inclusion of presence information may, depending on the size of such information, put the signaling over the size budget. On the other hand, communication size is generally less of a concern in best-effort signaling. Therefore, in best effort signaling data sharing sessions between subscriber user devices, embedding the presence information in the shared data may be performed with less concern as to the size of such presence information.

Figure 9:
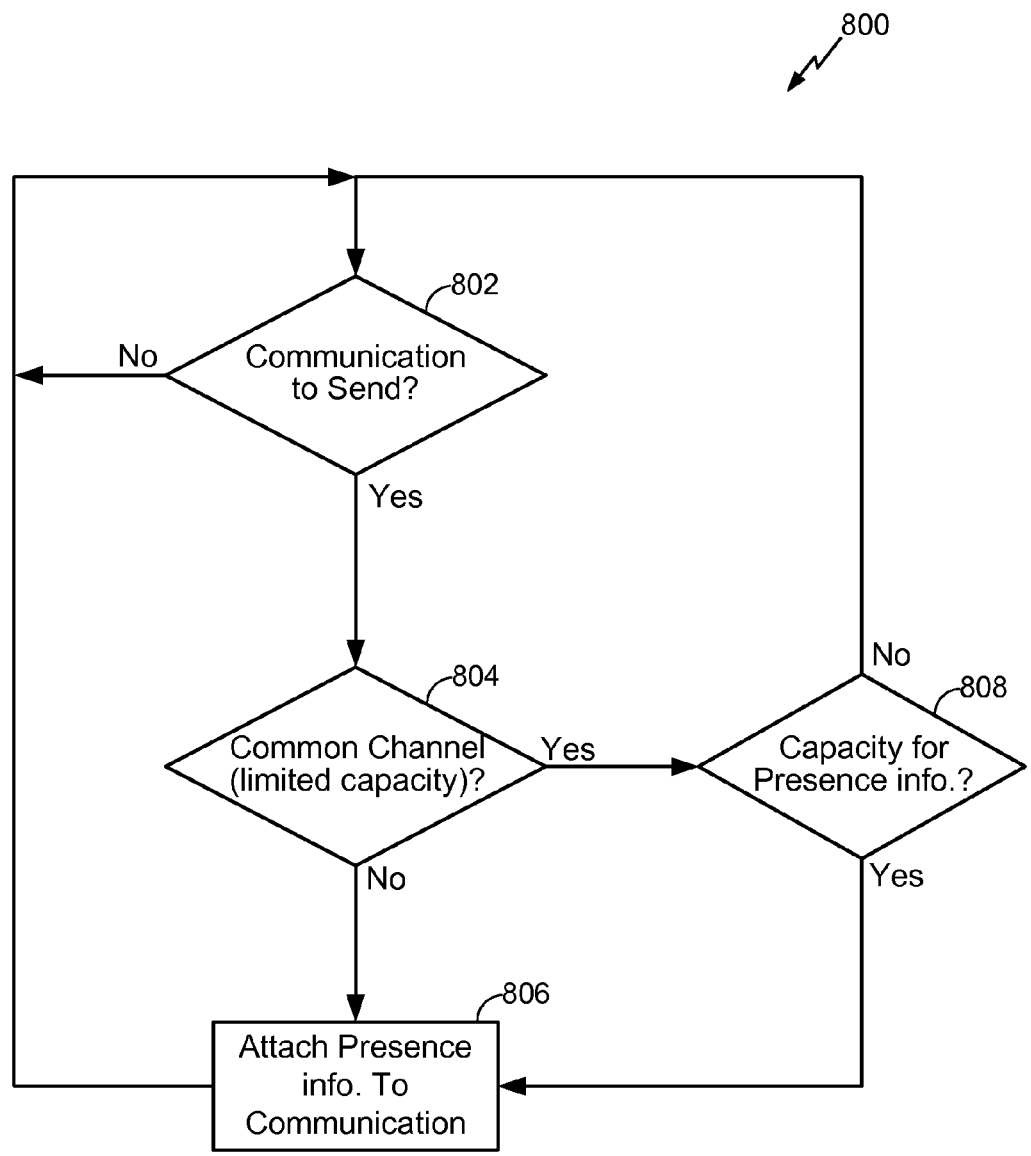
FIG. 9 is a functional block flow diagram showing one example presence communication according to one channel option aspect.

FIG. 9 is a functional block flow diagram 800 showing one example presence communication according to one channel or link option aspect as described above. It will be assumed that this FIG. 9 functional flow may be executed by, for example, programmable processor resources in a subscriber user device (e.g., UE 1) according to one or more embodiments. First, at decision block 802 the flow waits until there is a communication to send. The communication may, for example, be a media data to be pushed in a media sharing session. In the alternative, the communication may be an ACK/NAK in response to a push. If the answer is YES, the flow goes to 804 to determine if a common channel, assumed as having a limited capacity, will be used for the communication. If the answer at block 804 is NO, the flow goes to block 806 where it attaches or embeds the presence information, e.g., a PV update request (e.g., 505A and/or 525A of FIG. 4A, 515B and/or 545B of FIG. 4B, etc.) or a response (e.g., 510A and/or 515A of FIG. 4A, 520B and/or 525B of FIG. 4B, etc.) to a PV update request to the communication and sends it to the user device at the other end of the data sharing session, and returns to block 802 to wait for another communication to send. If the answer at block 804 is YES, meaning that a limited capacity common channel is being used, the flow goes to block 808 to determine if there is adequate capacity to attach, or embed, the presence information. If the answer at block 808 is YES, the flow goes to block 806, attaches or embeds the presence information (e.g. a PV update request or a response to a PV update request) in the communication, and returns to block 802 to wait for another shared data session communication. If the answer at block 808 is NO, meaning there is not adequate capacity to carry the presence information the flow returns to block 802. In one aspect, the processor of the user device may, after detecting a certain statistic or threshold in occurrences of NO at block 808, switch to sending the presence updating information by a non-shared channel. In an example, the process of FIG. 9 may execute in conjunction with the target frequency at which a particular sub-group of the Presence Update Group is to receive presence update messages from a particular UE. For example, to put FIG. 9 in context with FIGS. 4A and/or 4B, this means that the process of FIG. 9 may execute as a pre-cursor to the transmissions of 505A, 510A, 515A and/or 525A of FIG. 4A and/or 515B, 520B, 525B and/or 545B of FIG. 4B.

Figure 10:
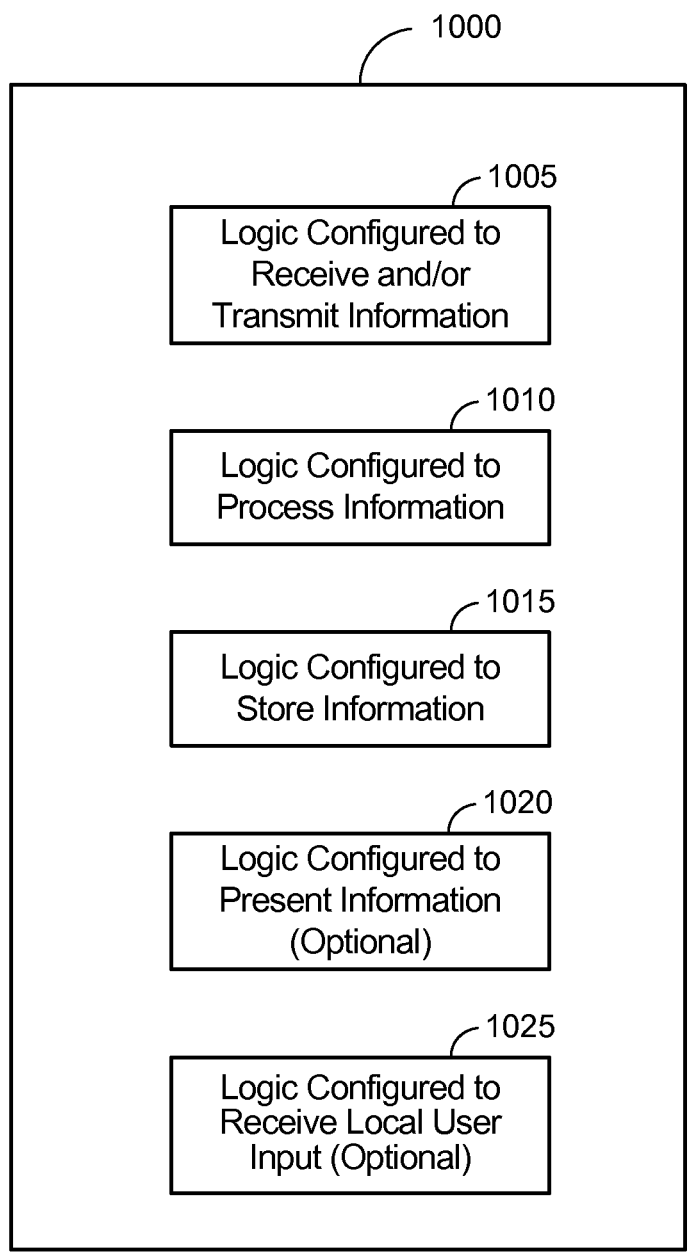
FIG. 10 illustrates a communication device that includes logic configured to perform functionality.

FIG. 10 illustrates a communication device 1000 that includes logic configured to perform functionality. The communication device 1000 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 1000 can correspond to any electronic device that is configured to communicate with (or facilitate communication with) one or more other entities over a network.

Referring to FIG. 10, the communication device 1000 includes logic configured to receive and/or transmit information 1005. In an example, if the communication device 1000 corresponds to a wireless communications device (e.g., UE 200, Node B 124, etc.), the logic configured to receive and/or transmit information 1005 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 1005 can correspond to a wired communications interface (e.g., a serial connection, a USB or Firewire connection, an Ethernet connection through which the Internet 175 can be accessed, etc.). Thus, if the communication device 1000 corresponds to some type of network-based server (e.g., SGSN 160, GGSN 165, application server 170, etc.), the logic configured to receive and/or transmit information 1005 can correspond to an Ethernet card, in an example, that connects the network-based server to other communication entities via an Ethernet protocol. In a further example, the logic configured to receive and/or transmit information 1005 can include sensory or measurement hardware by which the communication device 1000 can monitor its local environment (e.g., an accelerometer, a temperature sensor, a light sensor, an antenna for monitoring local RF signals, etc.). The logic configured to receive and/or transmit information 1005 can also include software that, when executed, permits the associated hardware of the logic configured to receive and/or transmit information 1005 to perform its reception and/or transmission function(s). However, the logic configured to receive and/or transmit information 1005 does not correspond to software alone, and the logic configured to receive and/or transmit information 1005 relies at least in part upon hardware to achieve its functionality.

Referring to FIG. 10, the communication device 1000 further includes logic configured to process information 1010. In an example, the logic configured to process information 1010 can include at least a processor. Example implementations of the type of processing that can be performed by the logic configured to process information 1010 includes but is not limited to performing determinations, establishing connections, making selections between different information options, performing evaluations related to data, interacting with sensors coupled to the communication device 1000 to perform measurement operations, converting information from one format to another (e.g., between different protocols such as .wmv to .avi, etc.), and so on. For example, the processor included in the logic configured to process information 1010 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 1010 can also include software that, when executed, permits the associated hardware of the logic configured to process information 1010 to perform its processing function(s). However, the logic configured to process information 1010 does not correspond to software alone, and the logic configured to process information 1010 relies at least in part upon hardware to achieve its functionality.

Referring to FIG. 10, the communication device 1000 further includes logic configured to store information 1015. In an example, the logic configured to store information 1015 can include at least a non-transitory memory and associated hardware (e.g., a memory controller, etc.). For example, the non-transitory memory included in the logic configured to store information 1015 can correspond to RAM memory, flash memory, ROM memory, EPROM memory, EEPROM memory, registers, hard disk, a removable disk, a CD-ROM, or any other form of storage medium known in the art. The logic configured to store information 1015 can also include software that, when executed, permits the associated hardware of the logic configured to store information 1015 to perform its storage function(s). However, the logic configured to store information 1015 does not correspond to software alone, and the logic configured to store information 1015 relies at least in part upon hardware to achieve its functionality.

Referring to FIG. 10, the communication device 1000 further optionally includes logic configured to present information 1020. In an example, the logic configured to present information 1020 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 1000. For example, if the communication device 1000 corresponds to UE 200 as shown in FIG. 3, the logic configured to present information 1020 can include the display 224. In a further example, the logic configured to present information 1020 can be omitted for certain communication devices, such as network communication devices that do not have a local user (e.g., network switches or routers, remote servers, etc.). The logic configured to present information 1020 can also include software that, when executed, permits the associated hardware of the logic configured to present information 1020 to perform its presentation function(s). However, the logic configured to present information 1020 does not correspond to software alone, and the logic configured to present information 1020 relies at least in part upon hardware to achieve its functionality.

Referring to FIG. 10, the communication device 1000 further optionally includes logic configured to receive local user input 1025. In an example, the logic configured to receive local user input 1025 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 1000. For example, if the communication device 1000 corresponds to UE 200 as shown in FIG. 3, the logic configured to receive local user input 1025 can include the display 224 (if implemented a touch-screen), keypad 226, etc. In a further example, the logic configured to receive local user input 1025 can be omitted for certain communication devices, such as network communication devices that do not have a local user (e.g., network switches or routers, remote servers, etc.). The logic configured to receive local user input 1025 can also include software that, when executed, permits the associated hardware of the logic configured to receive local user input 1025 to perform its input reception function(s). However, the logic configured to receive local user input 1025 does not correspond to software alone, and the logic configured to receive local user input 1025 relies at least in part upon hardware to achieve its functionality.

Referring to FIG. 10, while the configured logics of 1005 through 1025 are shown as separate or distinct blocks in FIG. 10, it will be appreciated that the hardware and/or software by which the respective configured logic performs its functionality can overlap in part. For example, any software used to facilitate the functionality of the configured logics of 1005 through 1025 can be stored in the non-transitory memory associated with the logic configured to store information 1015, such that the configured logics of 1005 through 1025 each performs their functionality (i.e., in this case, software execution) based in part upon the operation of software stored by the logic configured to store information 1015. Likewise, hardware that is directly associated with one of the configured logics can be borrowed or used by other configured logics from time to time. For example, the processor of the logic configured to process information 1010 can format data into an appropriate format before being transmitted by the logic configured to receive and/or transmit information 1005, such that the logic configured to receive and/or transmit information 1005 performs its functionality (i.e., in this case, transmission of data) based in part upon the operation of hardware (i.e., the processor) associated with the logic configured to process information 1010. Further, the configured logics or "logic configured to" of 1005 through 1025 are not limited to specific logic gates or elements, but generally refer to the ability to perform the functionality described herein (either via hardware or a combination of hardware and software). Thus, the configured logics or "logic configured to" of 1005 through 1025 are not necessarily implemented as logic gates or logic elements despite sharing the word "logic."

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for client-side distributed presence management accord to one or more of the disclosed embodiments. Accordingly, practice is not limited to illustrated examples and any mechanisms for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of decentralized presence management within a communications system performed at a user device, comprising:
   updating at least one frequency at which the user device transmits presence update messages to one or more other user devices that belong to a contact group associated with the user device, wherein the at least one frequency is based on a likelihood that the user device will communicate with the one or more other user devices and/or how recently communication occurred between the user device and the one or more other user devices;
   determining whether the user device is currently transmitting media to one or more of the one or more other user devices; and
   based on the user device transmitting media to one or more of the one or more other user devices, transmitting one or more presence update messages with the media being transmitted in accordance with the updated at least one frequency.

2. The method of claim 1, wherein presence information associated with the user device is based on an operational state associated with a multimedia application client that is configured for execution on the user device.

3. The method of claim 2, wherein the operational state is that the multimedia application client is being executed in a foreground or prominent portion of the user device's execution environment.

4. The method of claim 3, further comprising:
   increasing the at least one frequency at which the user device transmits presence update messages in response to a determination that the multimedia application client is being executed in the foreground or prominent portion of the user device's execution environment.

5. The method of claim 2, wherein the operational state is that the multimedia application client is being executed in a background or non-prominent portion of the user device's execution environment.

6. The method of claim 5, further comprising:
decreasing the at least one frequency at which the user device transmits presence update messages in response to a determination that the multimedia application client is being executed in the background or non-prominent portion of the user device's execution environment.

7. The method of claim 2, wherein the one or more other user devices are configured to execute a version of the multimedia application client.

8. The method of claim 1, wherein the one or more other user devices that belong to the contact group associated with the user device correspond to a subset of contacts of a subscriber that form a presence update group.

9. The method of claim 8,
wherein the presence update group includes a first sub-group of contacts associated with a first frequency at which the user device transmits the presence update messages,
wherein the presence update group includes a second sub-group of contacts associated with a second frequency at which the user device transmits the presence update messages, and
wherein the updating comprises determining whether to update the first frequency and/or the second frequency.

10. The method of claim 9, wherein the first sub-group of contacts has a higher priority than the second sub-group of contacts.

11. The method of claim 9, wherein the first frequency is higher than the second frequency.

12. The method of claim 1, wherein the updating is based on a number of the one or more other user devices to which the update will be sent.

13. The method of claim 12, further comprising:
decreasing the at least one frequency in response to a determination that the number is above a threshold.

14. The method of claim 12, further comprising:
increasing the at least one frequency in response to a determination that the number is not above a threshold.

15. The method of claim 1, wherein at least one of the one or more presence update messages is configured to request that a corresponding target user device respond with presence information associated with the corresponding target user device.

16. The method of claim 1, wherein the updating is based on an amount of time since a previous presence update message was received from at least one of the one or more other user devices.

17. The method of claim 16, further comprising:
decreasing the at least one frequency in response to a determination that the amount of time is above a threshold.

18. The method of claim 1, further comprising:
determining a set of priorities associated with the one or more other user devices, the one or more other user devices corresponding to a subset of contacts of a subscriber that form a presence update group,
wherein the updating is based on the determined set of priorities.

19. The method of claim 18, further comprising:
increasing a presence update transmission frequency for a first sub-group of contacts associated with a first priority that is higher than a second priority associated with a second sub-group of contacts.

20. The method of claim 18, further comprising:
decreasing a presence update transmission frequency for a first sub-group of contacts associated with a first priority that is lower than a second priority associated with a second sub-group of contacts.

21. The method of claim 1, wherein the updating is based on whether the user device is locked.

22. The method of claim 21, wherein the updating comprises:
determining a type of lock associated with the user device; and
updating the at least one frequency based on the determined type of lock.

23. The method of claim 1, wherein the updating comprises:
determining whether a subscriber is expected to operate an application for more than a threshold period of time; and
decreasing the at least one frequency in response to a determination.

24. The method of claim 1, wherein at least one of the one or more presence update messages transmitted to the one or more other user devices are indicative of a current presence state of the user device.

25. The method of claim 24, wherein the at least one or more presence update messages is further configured to request that a corresponding target user device respond with presence information associated with the corresponding target user device.

26. The method of claim 1, wherein the updating comprises:
determining whether any of the one or more other user devices have requested a particular presence update message frequency; and
if any of the one or more other user devices have requested the particular presence update message frequency, setting the frequency at which the user device transmits presence update messages to the determined one or more other user devices to the requested update message frequency.

27. The method of claim 1, wherein the updating comprises:
determining whether any of the one or more other user devices have requested a maximum frequency at which to receive presence update messages; and
if any of the one or more other user devices have requested the maximum frequency, setting the frequency at which the user device transmits presence update messages to the determined one or more other user devices to no greater than the requested maximum frequency.

28. The method of claim 1, wherein the updating is based on a determination of whether or not a subscriber operating the user device is likely able to see a display associated with the user device.

29. The method of claim 28, wherein the determination comprises at least one of:
determining whether or not the subscriber has put the user device down; or
determining whether or not the subscriber is holding the user device at the subscriber's ear.

30. A method of decentralized presence management within a communications system performed at a user device, comprising:
obtaining, by the user device, a subset of contacts of a subscriber operating the user device that form a presence update group;
identifying, by the user device, a first plurality of sub-groups within the presence update group based on priorities of the subset of contacts;

transmitting, by the user device, one or more presence update messages to less than all of the identified first plurality of sub-groups;
determining, by the user device, whether or not a priority of at least one contact in the subset of contacts has changed; and
identifying, by the user device, a second plurality of sub-groups within the presence update group based on determining that the priority of at least one contact in the subset of contacts has changed.

31. The method of claim 30, wherein the identifying comprises:
determining a given sub-group of contacts within the presence update group associated with a priority level below a threshold,
excluding, from the identified first plurality of sub-groups, the given sub-group of contacts.

32. The method of claim 30, wherein the identifying comprises populating each sub-group among the first plurality of sub-groups based on an associated priority.

33. The method of claim 32, wherein the associated priorities for the first plurality of sub-groups is based upon one or more criteria of each contact included in a respective sub-group including:
a user-assigned priority of the contact;
a frequency at which the subscriber and/or the user device communicates with the contact and/or a given user device operated by the contact;
an amount of time since the subscriber and/or the user device previously communicated with the contact and/or the user device operated by the contact;
social relationship characteristics between the subscriber and the contact;
a likelihood that the subscriber is expected to communicate with the contact within a threshold period of time;
an amount of time since the user device previously received a presence update message from the user device operated by the contact;
a frequency at which the contact and/or the user device operated by the contact has requested to receive presence update messages; and/or
a maximum frequency at which the contact and/or the user device operated by the contact has requested to receive presence update messages.

34. The method of claim 32, further comprising:
determining a first priority for a first sub-group among the identified first plurality of sub-groups;
determining a first frequency at which the user device is to transmit the presence update message to the first sub-group based on the first priority;
determining a second priority for a second sub-group among the identified first plurality of sub-groups; and
determining a second frequency at which the user device is to transmit the presence update message to the second sub-group based on the second priority,
wherein the transmitting comprises transmitting the one or more presence update messages to the first and second sub-groups in accordance with the first and second frequencies.

35. The method of claim 34,
wherein the first priority is higher than the second priority, and
wherein the first frequency is higher than the second frequency.

36. The method of claim 30, further comprising:
removing one or more contacts from the identified first plurality of sub-groups; and
continuing to transmit the one or more presence update messages to the identified first plurality of sub-groups minus the removed one or more contacts.

37. The method of claim 36, further comprising:
detecting a reduction in priority for at least one contact belonging to one of the identified first plurality of sub-groups,
wherein the removed one or more contacts corresponds to the at least one contact detected.

38. The method of claim 37, wherein the detecting comprises detecting the reduction in priority in response to a threshold period of time elapsing without communication between the user device and the user device operated by the at least one contact.

39. The method of claim 30, further comprising:
determining presence information associated with the subscriber operating the user device,
wherein the one or more presence update messages include the determined presence information.

40. The method of claim 39, wherein the one or more presence update messages is further configured to request that the less than all sub-groups respond with presence information.

41. The method of claim 30, wherein the one or more presence update messages is configured to request that the less than all sub-groups respond with presence information.

42. An apparatus for decentralized presence management within a communications system, comprising:
logic configured to update at least one frequency at which a user device transmits presence update messages to one or more other user devices that belong to a contact group associated with the user device, wherein the at least one frequency is based on a likelihood that the user device will communicate with the one or more other user devices and/or how recently communication occurred between the user device and the one or more other user devices;
logic configured to determine whether the user device is currently transmitting media to one or more of the one or more other user devices; and
logic configured to transmit, based on the user device transmitting media to one or more of the one or more other user devices, one or more presence update messages with the media being transmitted in accordance with the at least one updated frequency.

43. An apparatus for decentralized presence management within a communications system, comprising:
logic configured to obtain a subset of contacts of a subscriber operating the user device that form a presence update group;
logic configured to identify a plurality of sub-groups within the presence update group based on priorities of the subset of contacts;
logic configured to transmit one or more presence update messages to less than all of the identified plurality of sub-groups;
logic configured to determine whether or not a priority of at least one contact in the subset of contacts has changed; and
logic configured to identify a second plurality of sub-groups within the presence update group based on determining that the priority of at least one contact in the subset of contacts has changed.

44. An apparatus for decentralized presence management within a communications system, comprising:
means for updating at least one frequency at which a user device transmits presence update messages to one or more other user devices that belong to a contact group associated with the user device, wherein the at least one frequency is based on a likelihood that the user device will communicate with the one or more other user devices and/or how recently communication occurred between the user device and the one or more other user devices;

means for determining whether the user device is currently transmitting media to one or more of the one or more other user devices; and means for transmitting, based on the user device transmitting media to one or more of the one or more other user devices, one or more presence update messages with the media being transmitted in accordance with the at least one updated frequency.

45. An apparatus for decentralized presence management within a communications system, comprising:

means for obtaining a subset of contacts of a subscriber operating the user device that form a presence update group;

means for identifying a plurality of sub-groups within the presence update group based on priorities of the subset of contacts;

means for transmitting one or more presence update messages to less than all of the identified plurality of sub-groups;

means for determining whether or not a priority of at least one contact in the subset of contacts has changed; and means for identifying a second plurality of sub-groups within the presence update group based on determining that the priority of at least one contact in the subset of contacts has changed.

46. A non-transitory computer-readable medium for decentralized presence management within a communications system, comprising:

at least one instruction for updating at least one frequency at which a user device transmits presence update messages to one or more other user devices that belong to a contact group associated with the user device, wherein the at least one frequency is based on a likelihood that the user device will communicate with the one or more other user devices and/or how recently communication occurred between the user device and the one or more other user devices;

at least one instruction for determining whether the user device is currently transmitting media to one or more of the one or more other user devices; and at least one instruction for transmitting, based on the user device transmitting media to one or more of the one or more other user devices, one or more presence update messages with the media being transmitted in accordance with the at least one updated frequency.

47. A non-transitory computer-readable medium for decentralized presence management within a communications system, comprising:

at least one instruction for obtaining a subset of contacts of a subscriber operating the user device that form a presence update group;

at least one instruction for identifying a plurality of sub-groups within the presence update group based on priorities of the subset of contacts;

at least one instruction for transmitting one or more presence update messages to less than all of the identified plurality of sub-groups;

at least one instruction for determining whether or not a priority of at least one contact in the subset of contacts has changed; and at least one instruction for identifying a second plurality of sub-groups within the presence update group based on determining that the priority of at least one contact in the subset of contacts has changed.

\* \* \* \* \*